(12) United States Patent
Rosenberg et al.

(10) Patent No.: US 10,481,747 B2
(45) Date of Patent: Nov. 19, 2019

(54) SYSTEM FOR DETECTING AND CHARACTERIZING INPUTS ON A TOUCH SENSOR

(71) Applicant: Sensel Inc., Mountain View, CA (US)

(72) Inventors: Ilya Daniel Rosenberg, Mountain View, CA (US); John Aaron Zarraga, Mountain View, CA (US); Tomer Moscovich, Mountain View, CA (US)

(73) Assignee: Sensel Inc., Mountain View, CA (US)

( * ) Notice: Subject to any disclaimer, the term of this patent is extended or adjusted under 35 U.S.C. 154(b) by 242 days.

(21) Appl. No.: 15/701,320

(22) Filed: Sep. 11, 2017

(65) Prior Publication Data

US 2018/0074637 A1    Mar. 15, 2018

Related U.S. Application Data

(60) Provisional application No. 62/385,310, filed on Sep. 9, 2016.

(51) Int. Cl.
| | | |
|---|---|---|
| *G06F 3/041* | (2006.01) | |
| *G06F 3/0354* | (2013.01) | |
| *G06F 3/045* | (2006.01) | |
| *G06F 3/0488* | (2013.01) | |

(52) U.S. Cl.
CPC .......... *G06F 3/045* (2013.01); *G06F 3/03545* (2013.01); *G06F 3/0414* (2013.01); *G06F 3/0416* (2013.01); *G06F 3/0418* (2013.01); *G06F 3/0488* (2013.01); *G06F 2203/04104* (2013.01); *G06F 2203/04105* (2013.01)

(58) Field of Classification Search
CPC .... G06F 3/045; G06F 3/0488; G06F 3/03545; G06F 3/0418; G06F 3/0416; G06F 3/0414; G06F 2203/04104; G06F 2203/04105
See application file for complete search history.

(56) References Cited

U.S. PATENT DOCUMENTS

| | | | |
|---|---|---|---|
| 9,244,562 B1 * | 1/2016 | Rosenberg | .......... G06F 3/04847 |
| 2009/0251432 A1 | 10/2009 | Wang et al. | |
| 2011/0304577 A1 | 12/2011 | Brown et al. | |
| 2014/0055407 A1 * | 2/2014 | Lee ........................ | G06F 3/0416 345/174 |
| 2015/0091859 A1 * | 4/2015 | Rosenberg .............. | G06F 3/044 345/174 |
| 2016/0179245 A1 | 6/2016 | Johansson et al. | |
| 2016/0253007 A1 | 9/2016 | Worfolk et al. | |

* cited by examiner

*Primary Examiner* — Md Saiful A Siddiqui
(74) *Attorney, Agent, or Firm* — Run8 Patent Group, LLC; Peter Miller

(57) ABSTRACT

One variation of a method for characterizing inputs includes: scanning an array of sense electrodes at a first resolution to generate a first force image; detecting a first force input in the first force image; in response to a first geometry dimension of the first force input exceeding a first threshold, characterizing the first force input as a non-stylus input type; in response to the first geometry dimension of the first force input remaining below the first threshold: scanning the array of sense electrodes at a second resolution; detecting a second force input in a second force image; and, in response to a ratio of a force magnitude of the second force input to a geometry dimension of the second force input exceeding a second threshold, characterizing the first force input as a stylus input type; and outputting a location and a type of the first force input.

20 Claims, 7 Drawing Sheets

SYSTEM FOR DETECTING AND CHARACTERIZING INPUTS ON A TOUCH SENSOR

CROSS-REFERENCE TO RELATED APPLICATIONS

This Application claims the benefit of U.S. Provisional Application No. 62/385,310, filed on 9 Sep. 2016, which is incorporated in its entirety by this reference.

This Application is related to U.S. patent application Ser. No. 15/224,003, filed on 29 Jul. 2016; U.S. patent application Ser. No. 15/223,968, filed on 29 Jul. 2016; U.S. patent application Ser. No. 15/470,669, filed on 27 Mar. 2017; and U.S. patent application Ser. No. 15/476,732, filed on 31 Mar. 2017, all of which are incorporated in their entireties by this reference.

TECHNICAL FIELD

This invention relates generally to the field of touch sensors and more specifically to a new and useful system for detecting and characterizing inputs on a touch sensor in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
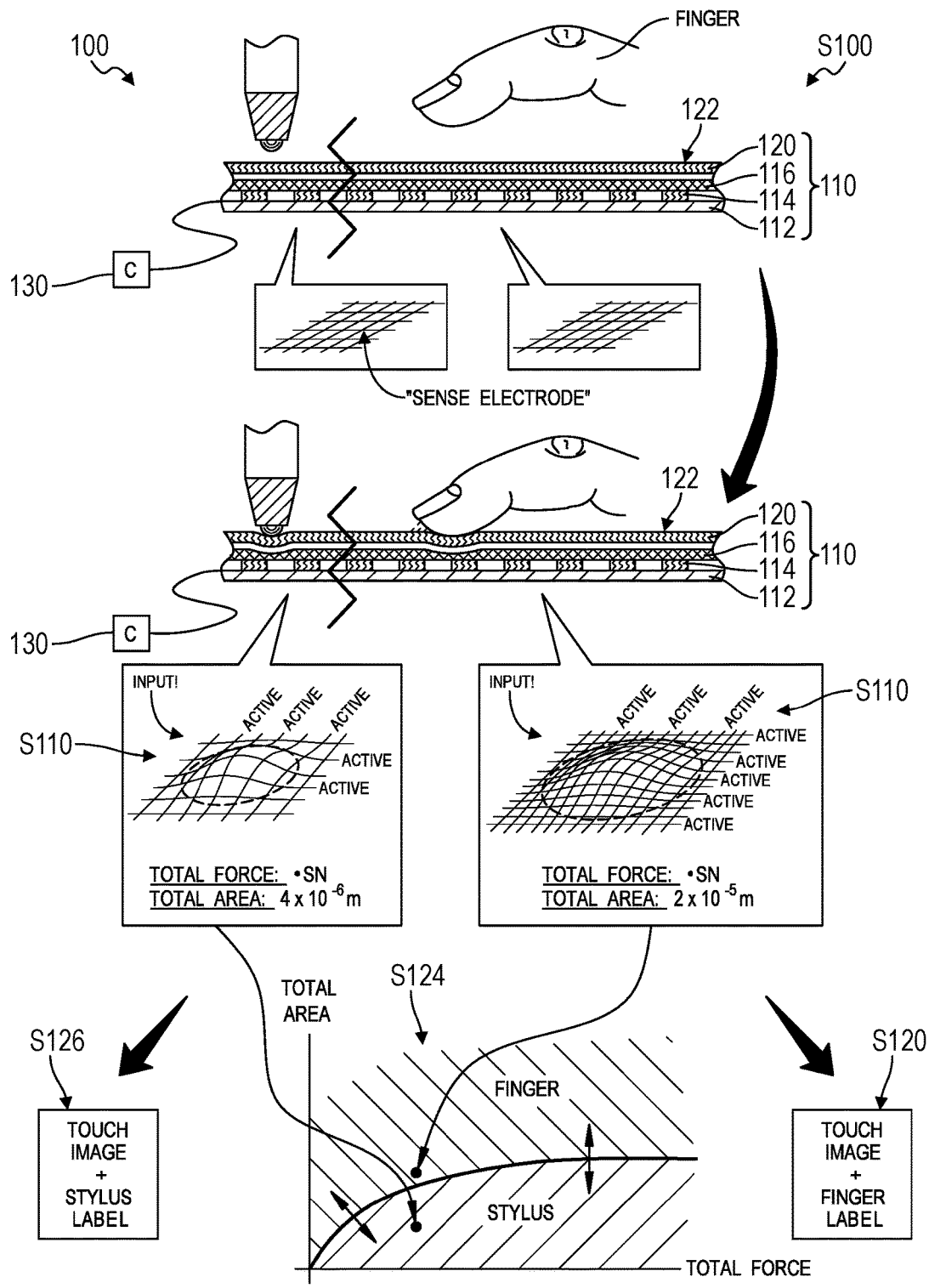
FIG. 1 is a flowchart representation of a system.

As shown in FIG. 1, a system for detecting and characterizing inputs on a touch sensor surface includes: a touch sensor 110 including: a substrate 112; an array of sense electrodes 114 patterned across the substrate 112; and a resistive layer 116 arranged over the substrate 112 and including a material exhibiting changes in local contact resistance responsive to variations in magnitude of force communicated into the resistive layer 116; a force-spreading layer 120 arranged over the resistive layer 116, defining the touch sensor surface 122, and distributing a force applied on and normal to the touch sensor surface 122 laterally and into the resistive layer 116; and a controller 130 configured to: detect an input on the force-spreading layer 120 based on local changes in resistance within the resistive layer 116 measured by a subset of sense electrodes in the touch sensor; and characterize the input as one of a stylus input and a non-stylus input based on a ratio of a detected force magnitude to a detected area of the input on the force-spreading layer 120.

2. Applications

Generally, the system includes: a touch sensor 110; a force-spreading layer 120 that spreads an applied force laterally and communicates this spread force into the touch sensor; and a controller 130 that reads the touch sensor 110 during a sampling period, detects the magnitude, location, and contact area of a force applied to the touch sensor surface 122, determines a type of the object that applied the force based on these data, and packages these data and the object characterization into a touch image (or a list of touch contact locations, etc.) that can be read by an integrated or connected computing device to control a cursor, enter a keystroke, or otherwise control a user interface. In particular, the system can function as a peripheral or integrated input device for a computing device and can detect, characterize, and assemble inputs into touch images or lists of touch contacts that can be read to control various functions of the computing device. For example, the system can define a peripheral touchpad or keyboard that can be transiently coupled to a laptop computer or tablet, a touchpad or keyboard integrated into a laptop computer, a tablet, mobile phone, or a touchpad integrated into a peripheral keyboard, etc. and that outputs one touch image containing representations of forces applied to the touch sensor surface 122 per scan cycle (e.g., at a rate of 100 Hz).

A user can thus enter an input (e.g., a force input) on the touch sensor surface 122, such as with a stylus (e.g., an active, passive, or capacitive multi-touch pen) or with a finger, and the controller 130 can identify this input based on a local change in contact resistance of the resistive layer 116 (or other electrical property, such as capacitance) detected by one or more sense electrodes in the touch sensor. Furthermore, the force-spreading layer 120 functions to distribute a force—applied by an object on the touch sensor 110—laterally as this force is communicated into the resistive layer 116, thereby spreading this force over a greater area of the resistive layer 116, yielding reduced compression of the resistive area over a greater area, and redistributing changes in contact resistance of the resistive layer 116 resulting from the input over a greater number of sense electrodes. The force-spreading layer 120 can thus increase the effective dynamic range of the system, enable the controller 130 to repeatedly detect a force input over an input area of dimension similar to or less than the sense electrode pitch in the touch sensor no by spreading such a force over multiple sense electrodes, and enable the controller 130 to distinguish an input by a finger (which may have a relatively low ratio of applied force to input area), an input by a stylus (which may have a relatively high ratio of applied force to input area), and an input by a palm or other non-stylus device (which may have a relatively low ratio of applied force to input area). Furthermore, the force-spreading layer can increase sensor accuracy by spreading forces applied to the touch sensor surface over multiple sense electrodes, thereby decreasing a peak force detected at each sense electrode. By distributing force over multiple sense electrodes, the force-spreading layer can increase probability that the peak force falls within a dynamic sensing range of each sense electrode and, thus, avoid saturating (or oversaturating) one or more sense electrodes proximal a force-input. Thus, the system can differentiate between input types and output commands to a computing device, such as a computer system or a mobile computing device (e.g., a smartphone), coupled to the system to render appropriate graphical representations corresponding to the type of input detected by the system. For example, the system can detect a stylus input. A computing device coupled to the system can therefore draw a point (e.g., in a sketching software program) at a location within a window rendered on a display of the computing device corresponding to a location of the stylus input. Similarly, the system can detect a finger input and the computing device coupled to the system can scroll or toggle through a document rendered in the window rather than drawing a point or line over the document. Additionally, the system can detect a palm or other non-stylus input and the controller of the system can reject the input as incidental due to natural contact of a user's hand (e.g., knuckle, finger, or wrist) with the touch sensor surface as the user writes or draws with a stylus on the touch sensor surface. Therefore, the system can be configured to distinguish between intentional and incidental inputs to improve accuracy and relevance of graphical representations of inputs detected on the touch sensor surface.

Additionally, the system can learn and adapt to input patterns to, in real-time, predict an input type and output an appropriate command corresponding to the input type while minimizing computational processing and latency to distinguish the input type. For example, as a user writes with a stylus on the touch sensor surface, the system can record the user's handwriting position and contact patterns with the touch sensor surface. In this example, the user may tend to drag her wrist and pinky finger across the touch sensor surface while writing with a stylus or other pen held in her right hand. As described below, during an initiation period, the system can detect a pattern of inputs to the touch sensor surface to learn the user's handwriting position. In response to detecting the pattern of inputs at a future time, the system can determine that the user is likely writing on the touch sensor surface with a stylus; thus, the system can flag inputs in the pattern of inputs according to input type labels assigned to inputs in the pattern of inputs during the initiation period and reject (or omit the output from the system) non-stylus (e.g., finger or palm) input types within the pattern of inputs. Therefore, the system can be configured to reduce latency between a handwriting input event on a touch sensor surface and rendering a graphical representation of the handwriting input event for real-time emulation of handwriting on the touch sensor surface.

Furthermore, the system can be configured to reduce input noise and improve accuracy of input type classifications such that a computing device coupled to the touch sensor can render relevant and smooth graphical representations of an input detected by the system. The system can detect and interpolate locations and force magnitudes of inputs and, as described above, reduce latency to improve smoothness (i.e., reduce noise), magnitude, and accuracy of a graphical representation of the input (e.g., a line drawn across the touch sensor surface with a stylus).

The system is described herein as including a force-spreading layer 120 and a controller 130 that cooperate to detect and distinguish an input by a palm and an input by a stylus. However, the system can be similarly configured to detect and distinguish inputs by any other object or surface, such as a finger, a glove, a paint brush, etc.

3. Touch Sensor

Figure 3:
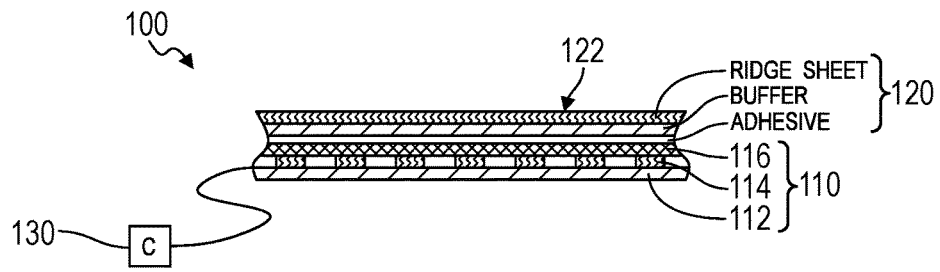
FIG. 3 is a schematic representation of one variation of the system.
Figure 4:
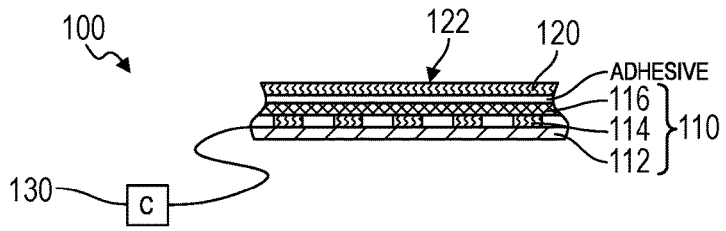
FIG. 4 is a schematic representation of one variation of the system.

As shown in FIGS. 1, 3, and 4, the touch sensor 110 includes: an array of sense electrode and drive electrode pairs patterned across a substrate 112 (e.g., a fiberglass PCB); and a force-sensitive resistive layer 116 arranged over the substrate 112 in contact with the sense and drive electrode pairs (or "sense electrodes"), defining a material exhibiting variations in local bulk resistance and/or local contact resistance responsive to variations in force applied to the touch sensor surface 122 above. As described in U.S. patent application Ser. No. 14/499,001, the resistive touch sensor can include a grid of inter-digitated drive electrodes and sense electrodes patterned across the substrate 112. The resistive layer 116 can span gaps between each drive and sense electrode pair across the substrate 112 such that, when a localized force is applied to the touch sensor surface 122, the resistance across an adjacent drive and sense electrode pair varies proportionally (e.g., linearly, inversely, quadratically, or otherwise) with the magnitude of the applied force. As described below, the controller 130 can read resistance values across each drive and sense electrode pair within the touch sensor 110 and can transform these resistance values into a position and magnitude of one or more discrete force inputs applied to the touch sensor surface 122 and can characterize each discrete force input as one of a stylus input and a finger input.

In one implementation, the substrate 112 defines a rigid substrate 112, such as in the form of a rigid PCB (e.g., a fiberglass PCB) or a PCB on a rigid backing (e.g., an aluminum backing plate); and rows and columns of drive and sense electrodes are patterned across the top of the substrate 112 to form an array of sense electrodes 114. The resistive layer 116 is installed over the array of sense electrodes 114 and connected to the substrate 112 about its perimeter. As described below, the force-spreading layer 120 can be fabricated, bonded, installed, or otherwise incorporated into the system over the resistive layer 116.

4. Controller

Figure 2:
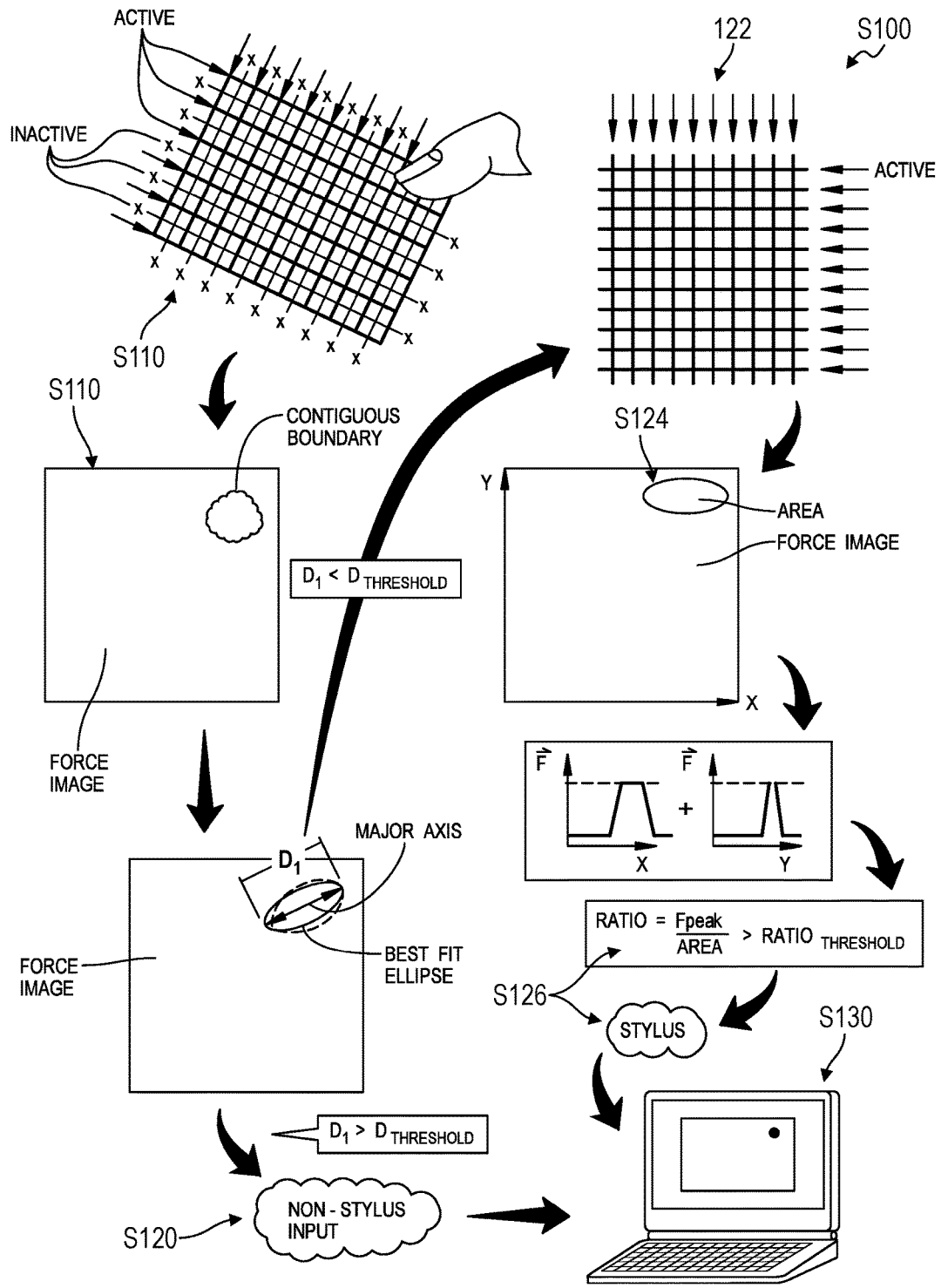
FIG. 2 is a flowchart representation of a method.

As shown in FIGS. 1 and 2, the controller 130 is configured to: detect a force input on the touch sensor surface 122 based on local changes in resistance in the resistive layer 116 measured by a subset of sense electrodes in the touch sensor no and to characterize the input as one of a stylus input and a non-stylus (e.g., finger, knuckle, or palm) input based on a detected force magnitude and a detected area of the input on the touch sensor surface 122. Generally, the controller 130 functions to drive the touch sensor, to read resistance values between drive and sense electrodes during a scan cycle, to transform resistance data from the touch sensor no into locations and magnitudes of force inputs over the touch sensor surface 122, and to characterize a detected input (e.g., as one of a stylus input or a non-stylus input) based on a ratio of area to force magnitude of the input, as described below. The controller 130 can also function to transform locations and/or magnitudes of forces recorded over two or more scan cycles into a gesture, a cursor motion vector, a keystroke, or other command, such as based on the type of input, and to output such command to a computing device in which the system is integrated or to which the system is connected. For example, for the system that is integrated into a larger computing device, the controller 130 can access preprogrammed command functions stored in memory in the computing device, such as command functions including a combination of trackpad and keyboard values readable by the computing device to move a virtual cursor, to scroll through a text document, to expand a window, to translate and rotate a 2D or 3D virtual graphical resource within a window, or to enter text and keyboard shortcuts, etc.

In one implementation, the controller 130 includes: an array column driver (ACD); a column switching register (CSR); a column driving source (CDS); an array row sensor (ARS); a row switching register (RSR); and an analog to digital converter (ADC); as described in U.S. patent application Ser. No. 14/499,001. In this implementation, the touch sensor 110 can include a variable impedance array (VIA) that defines: interlinked impedance columns (IIC) coupled to the ACD; and interlinked impedance rows (IIR) coupled to the ARS. During a resistance scan cycle: the ACD can select the IIC through the CSR and electrically drive the IIC with the CDS; the VIA can convey current from the driven IIC to the IIC sensed by the ARS; the ARS can select the IIR within the touch sensor 110 and electrically sense the IIR state through the RSR; and the controller 130 can interpolate sensed current/voltage signals from the ARS to achieve substantially accurate detection of proximity, contact, pressure, and/or spatial location of a discrete force input over the touch sensor 110 for the resistance scan cycle within a single scan cycle.

The controller 130 can be arranged on substrate 112 to form a fully contained touch sensor that: receives power from the connected computing device, detects inputs on the touch sensor surface 122; and processes these inputs. Alternatively, all or portions of the controller 130 can be remote from the substrate 112, such as arranged within the connected computing device and/or physically coextensive with one or more processors or controllers 130 within the connected or integrated computing device.

5. Force-Spreading

As shown in FIG. 1, the force-spreading layer 120 is arranged over the resistive layer 116, defines a touch sensor surface, and distributes a force applied on and normal to the touch sensor surface 122 laterally and into the resistive layer 116. Generally, the force-spreading layer 120 functions to communicate a force—applied to the touch sensor surface 122 by an object—into the sensor over an area greater than the contact area between the object and the touch sensor surface 122. In particular, the force-spreading layer 120 can include one or more materials of a particular geometry that spreads a force applied by an object (e.g., a stylus, a finger, a palm) to the touch sensor surface 122 across multiple sense electrodes in the touch sensor 110 such that: the system can detect, locate, and characterize an object (e.g., a stylus) contacting the touch sensor surface 122 over an area substantially similar to or less than an active sense electrode pitch while also preserving unique contact-area-to-applied-force ratios characteristic of different objects in contact with the touch sensor surface 122.

In one implementation, the force-spreading layer 120 includes a sheet of material relatively more rigid than the resistive layer 116, such as a sheet of glass, polycarbonate, urethane, or rubber (e.g., silicone) layer of a relatively high durometer (e.g., Shore 70A or greater). The force-spreading layer 120 can be bonded directly over the resistive layer 116, such as with a thin layer of UV-curable adhesive or pressure sensitive adhesive as shown in FIG. 1. Alternatively, the force-spreading layer 120 can include an elastic layer interposed between the rigid sheet and the resistive layer 116, as shown in FIG. 3, and this elastic layer can function as a buffer that permits the rigid layer to deform inwardly toward the resistive layer 116 under and around the location of a force input (e.g., by a finger or stylus) on the touch sensor surface 122. For example, the force-spreading layer 120 can include a urethane, polycarbonate, or PET sheet 0.1 to 0.5 millimeter in thickness bonded over an elastic layer—or a "buffer layer" of solid silicone or close-cell silicone foam—0.1 to 0.5 mm in thickness with a thin layer of adhesive (e.g., UV-curable or pressure-sensitive adhesive). In this example, the elastic layer can be similarly bonded over the resistive layer 116 opposite the touch sensor. Yet alternatively, the force-spreading layer 120 can include a rigid sheet bonded directly to the resistive layer 116 with a buffer layer including a relatively thick (e.g., 0.1 to 0.5-millimeter-thick) layer of adhesive, as shown in FIG. 4. The force-spreading layer 120 can also include a surface coating exhibiting scratch resistance, dent resistance, impermeability to common fluids, low glare, etc. across the touch sensor surface 122. However, the force-spreading layer 120 can include one or more layers of any other material of any other thickness or geometry.

In this implementation, the buffer layer can also exhibit other functionality. For example, the buffer layer can include a patterned light-pipe or back-light configured to distribute light to select regions of the force-spreading layer 120, such as to visually indicate particular input regions. In this example, the back side of the force-spreading layer 120 can patterned with a light-reflective or light-absorptive coating in order to selectively allow pass light through select areas or the force-spreading layer 120, the back side of the force-spreading layer 120 can be patterned with a colored coating or "gel" in order to modify a color of light emitted through the force-spreading layer 120. Similarly, the buffer layer can include a flexible display or can include an elastic layer bonded directly above or below a flexible display.

The contact area of a stylus tip may be relatively small compared to a finger and may define a contact area similar in size to (or even smaller than) the pitch between active sense electrodes within the sensor, as shown in FIG. 1. Thus, when a stylus is depressed onto a touch sensor surface of a similar system without a force-spreading layer 120, a local pressure change within a resistive layer 116 may occur predominantly or exclusively over a single sense electrode within a similar touch sensor in the similar system. When a user draws the stylus across the touch sensor surface 122 of the similar system, such as when writing or drawing, local reduction in contact resistance over a sense electrode (or local reduction in bulk resistance over the sense electrode) due to increased local pressure under the tip of the stylus may regularly exceed the dynamic range of the adjacent sense electrode. Specifically, this local change in contact (or bulk) resistance within the resistive layer 116 may exceed a range of contact (or bulk) resistance values that a sense electrode within the touch sensor 110 can detect. During common use of the stylus, the similar system may therefore be incapable of distinguishing stylus inputs of different force magnitudes due to limited dynamic range of each sense electrode, a low ratio of sense electrode pitch to stylus tip contact area, and limited force spreading between the touch sensor surface 122 and the resistive layer 116.

Furthermore, for a stylus exhibiting a tip of width (e.g., diameter) similar to or less than the pitch between active sense electrodes within the similar system excluding a force-spreading layer 120, a change in the resistance of the resistive layer 116 due to the stylus input may be severely localized such that only a single sense electrode within the similar system registers a local change in contact resistance indicative of this input on the touch sensor surface 122. Given detection of the input by such a limited number of sense electrodes, the similar system may have insufficient data to interpolate the real location of the input on the touch sensor surface 122. Furthermore, given such limited sensor data per stylus input event, the similar system may be incapable of precisely (i.e., accurately and repeatably) correlating the magnitude change in contact resistance measured by an adjacent sense electrode with the magnitude of the force applied by the stylus. For example, if the stylus is applied to the touch sensor surface 122 directly over a particular sense electrode, the magnitude of change in the output of the particular sense electrode may be directly proportional to the magnitude of the force applied by the stylus; however, if the stylus is applied to the touch sensor surface 122 laterally offset by a small distance (e.g., 0.5 mm) from a nearest sense electrode, the magnitude of change in the output of this nearest sense electrode may no longer be proportional to the magnitude of the force applied by the stylus. Given data from a sufficient number of sense electrodes—proximal the stylus input—indicating a magnitude change in the local contact resistance of the resistive layer 116, the similar system may have sufficient information to interpolate the real location of the stylus input on the touch sensor surface 122 to a suitable degree of accuracy (e.g., to sub-sensor-pitch resolution) and then interpolate the real magnitude of the applied force given this input location and the magnitude change in contact resistance detected by one sense electrode; however, localization of contact resistance changes within the resistive layer 116 to a single sense electrode (or a very limited number of sense electrodes) in the presence of a stylus input may prevent the similar system from accurately interpolating the real location of the input on the touch sensor surface 122. Similarly, given a known force magnitude of the stylus input, the similar system may transform a contact resistance change measured at a sense electrode into a real lateral distance of the center of the input from the sense electrode; however, the similar system may not achieve an accurate force magnitude measurement due to such high localization of contact resistance changes within the resistive layer 116. Without the force-spreading layer 120, the similar system may therefore be incapable of precisely determining the location of a stylus input on the touch sensor surface 122, determining a magnitude of force applied by the stylus, and transforming sense electrode data as the user writes or draws the stylus across the touch sensor surface 122 into a smooth, continuous input path with smooth, continuous force magnitude changes.

The system can therefore include a force-spreading layer 120 that functions to distribute a force applied by a stylus to the touch sensor surface 122 across a region of the resistive layer 116 spanned by multiple sense electrodes. In particular, in the presence of a stylus input in which a force exceeding a minimum force threshold is applied to the touch sensor surface 122, the force-spreading layer 120 can distribute this applied force laterally—that is, perpendicular to the direction of the applied force—across the resistive layer 116: such that a wider area of the resistive layer 116 is compressed under and around the stylus input; and such that a resulting change to the local contact resistance of the resistive layer 116 across the touch sensor 110 spans can be measured by multiple sense electrodes regardless of the location of the stylus input on the touch sensor surface 122.

In one example, the touch sensor 110 includes a grid array of sense electrodes 114 on a two-millimeter pitch between active sense electrodes. When the tip of a stylus approximately one millimeter in diameter is depressed onto the touch sensor surface 122 with a force typical of writing or drawing, the force-spreading layer 120 can spread the force of the stylus from the one-millimeter-diameter contact area to an area approximately five millimeters in diameter area at the touch sensor no (e.g., at the interface between the bottom of the resistive layer 116 and the top of the sense electrodes). In this example, the force-spreading layer 120 can communicate a near-point force applied by the stylus into the resistive layer 116 according to a Gaussian distribution with peak communicated force coincident the center of the contact area and with communicated force diminishing toward the perimeter of the communicated force area. Therefore, when the tip of a stylus of size similar to the sense electrode pitch of the touch sensor 110 is applied to the touch sensor surface 122 under common conditions (e.g., a typical handwriting force), the force-spreading layer 120 can communicate this applied force into an area of the resistive layer 116 of sufficient size to be detected by at least four active sense electrodes in the touch sensor. The controller 130 can then reconstruct outputs from these four active sense electrodes into a touch image and analyze this touch image to both characterize the input as a stylus input and to determine the location of the input (e.g., the centroid of the input area) on the touch sensor surface 122.

In the foregoing example, because the force-spreading layer 120 communicates the force applied by the tip of the stylus into the sensor over an area approximately twenty-five times greater than the contact area of the stylus tip on the touch sensor surface 122, a local pressure rise within the resistive layer 116 directly under the stylus tip due to application of the stylus on the touch sensor surface 122 may be similarly reduced, thereby yielding similar reduction to a change in contact (or bulk) resistance across this region of the resistive layer 116 compared to the similar system described above. The single sense electrode immediately under or nearest the stylus (a "center sense electrode") may output a signal of lesser magnitude compared to a baseline due to redistribution of force by the force-spreading layer 120 (or redistribution of force to nearby areas of the resistive layer 116 may bring the change in contact resistance of the region of the resistive layer 116 over the center sense electrode within the dynamic range of the center sense electrode). However, by redistributing some of the applied force to a surrounding region of the resistive layer 116, the force-spreading layer 120 increases a change to the contact resistance in a region of the resistive layer 116 over sense electrodes adjacent the center sense electrode to a level that falls within the dynamic range of these adjacent sense electrodes (i.e., that can be detected by the adjacent sense electrodes).

Furthermore, by spreading a force applied to the touch sensor surface 122 by a stylus (or by a finger or other object), the force-spreading layer 120 can increase the effective dynamic range of the system, such as to cover a range of forces containing and/or more closely centered within a common range of forces applied by an adult user with a stylus or finger when writing or drawing. For example, when a very light force is applied to the touch sensor surface 122, the force-spreading layer 120 can spread this force only very minimally across a local area of the resistive layer 116. This force may be communicated to a single nearest sense electrode; if this force is of a magnitude that falls within the dynamic range of this nearest sense electrode, this force may be detected by this sense electrode in the form of a detected change in contact resistance in the resistive layer 116. The controller 130 can then locate the input within a circular area of diameter equal to the pitch diameter and centered around this one sense electrode. However, if a slightly greater force is applied to the touch sensor surface 122 by a stylus, the force-spreading layer 120 may communicate this force into an area of the resistive layer 116 spanning two sense electrodes. Though the dynamic ranges of sense electrodes in the touch sensor no are fixed and substantially similar, the increased magnitude of this force yields a slight increase in force applied to one sense electrode, but this force is now detected by two sense electrodes that cooperate to exhibit a greater (e.g., doubled) dynamic range when activated. Furthermore, if an even greater force is applied to the touch sensor surface 122, the force-spreading layer 120 can communicate this increased force into an even greater area of the resistive layer 116 spanning three or more sense electrodes that individually detect changes in contact resistance within the resistive layer 116 (correlated with applied force) within their singular dynamic ranges but that together cooperate to detect this applied force that may be of a magnitude beyond the dynamic range of one sense electrode in the touch sensor.

Furthermore, the force-spreading layer 120 may reduce a local change in contact resistance of the resistive layer 116 over one sense electrode (e.g., by a factor of 25:1) in response to application of a force of a given magnitude on the touch sensor surface 122, thereby raising the minimum applied force detectable by each sense electrode in the touch sensor. However, this minimum detectable force may still be less than a threshold force magnitude implemented by the controller 130 to distinguish an intentional input of force greater than the threshold force magnitude from a resting or inadvertent input less than the threshold force magnitude. Also by spreading the force applied by the tip of a stylus—of diameter similar to or less than the pitch between active pixels in the touch sensor 110—the force-spreading layer 120 can enable multiple sense electrodes to detect local contact resistance changes indicative of a local applied force, and the controller 130 can transform these local contact resistance values into a particular location of the center of the tip of the stylus on the touch sensor surface 122 to a resolution significantly greater than the sense electrode pitch, as described below.

In the above example in which the touch sensor 110 includes sense electrodes arranged at a pitch of two millimeters, the force-spreading layer 120 can communicate a force—of the same magnitude but applied by a finger (e.g., a pointer finger) to the touch sensor surface 122 over an area approximately 10 mm in diameter—into the resistive layer 116 over an area approximately fifteen millimeters in diameter. Generally, the contact area of a stylus tip is relatively small compared to a finger, but forces of similar magnitudes may be applied to the touch sensor surface 122 by a user with a stylus and a finger alike. Furthermore, once a boundary of an input area is identified, the controller 130 can distinguish a stylus input from a non-stylus input based on a ratio of input area to peak force or a ratio of input area to total force, etc. characterizing the input, as described below. Therefore, by spreading forces applied by both styluses and fingers, the force-spreading layer 120 can preserve characteristic differences between stylus inputs and non-stylus inputs.

In one variation, the force-spreading layer 120 is transiently coupled to the resistive layer 116, such as in the form of an overlay that can be selectively installed on and removed from the system by a user to achieve different sensitivities to inputs into the system. For example, when using the system with a stylus to enter digital drawing or handwriting vectors into a computing device, the user can install the force-spreading layer 120 over the resistive layer 116 to enable the controller 130 to detect and distinguish stylus inputs and non-stylus inputs (e.g., finger inputs and palm inputs). In this example, when using the system with a broad paintbrush to enter digital brush strokes into the computing device, the user can remove the force-spreading layer 120 over the resistive layer 116 to enable the controller 130 to detect lower-pressure inputs by the paintbrush.

6. Method: Input Detection and Characterization

As shown in FIG. 2, the system 100 can implement the method S100 for detecting and characterizing inputs on a touch sensor surface of an input device including: at a first time, scanning an array of sense electrodes, arranged under the touch sensor surface, at a first resolution to generate a first force image in Block S110; detecting a first force input in the first force image in Block S112; in response to a first geometry dimension of the first force input exceeding a first threshold, characterizing the first force input as a non-stylus input type in Block S120; in response to the first geometry dimension of the first force input remaining below the first threshold: at a second time succeeding the first time, scanning a subset of the array of sense electrodes at a second resolution greater than the first resolution to generate a second force image, the subset of the array of sense electrodes coincident the first force input in Block S122; detecting a second force input in the second force image proximal the first force input in Block S124; and, in response to a second ratio of a second force magnitude of the second force input to a second geometry dimension of the second force input exceeding a second threshold, characterizing the first force input as a stylus input type in Block S126; and outputting, to a computing device coupled to the array of sense electrodes, a location and a type of the first force input in Block S130.

Generally, during operation, the controller 130 can regularly sample active sense electrodes in the touch sensor, such as at a rate of 100 Hz, in Block S110 and transform data read from all or a subset of these active sense electrodes into the location, force magnitude, and input type for each of one or more inputs on the touch sensor surface 122, as shown in FIG. 1.

6.1 3D Force Surface Mesh

The controller 130 can implement Blocks S110 and S112 of the method S100 as described in U.S. patent application Ser. No. 14/499,001 to sample an active sense electrode during a scan cycle in Block S110, the active sense electrode outputting an analog value representing a contact resistance within a region of the resistive layer 116 spanning the ground and sense electrodes of the active sense electrode. The controller 130 then compares output values of a set of active sense electrodes sampled during the scan cycle to one or more (static or rolling) baseline values to identify output changes across a subset of these active sense electrodes indicative of a force applied to the touch sensor surface 122 over this subset of active sense electrodes. For each active sense electrode in the set or subset of active sense electrodes, the controller 130 can then implement a static conversion coefficient or a parametric conversion model to transform a difference between the active sense electrode output value and a corresponding baseline value into a force value representing a magnitude of a force applied to the touch sensor surface 122 over the active sense electrode (or into a pressure value representing a pressure communicated through the resistive layer 116 into the active sense electrode of known area). The controller 130 can then implement spline interpolation techniques to map a smooth spline to force values corresponding to active sense electrodes in one row of active sense electrodes in the touch sensor; the controller 130 can repeat this process to map a smooth spline to a subset of force values corresponding to active sense electrodes in each other row and in each other column of active sense electrodes in the touch sensor, as shown in FIG.

1. For example, the controller 130 can implement best-fit line techniques and a parametric model for deflection of the force-spreading layer 120 (such as by a point load) based on the modulus of elasticity of the force-spreading layer 120 to define a shape or geometry of a spline mapped to two or more force magnitudes calculated from data read from two or more sense electrodes in one row or in one column of sense electrodes in the touch sensor.

For example, the controller 130 can define a contiguous boundary encompassing force values, defined in a force image, exceeding a minimum force threshold; calculate a geometry dimension (e.g., a length or a width of an area) as a function of an input area encompassed by the contiguous boundary; and calculate the force magnitude as a function of a peak force value within the contiguous boundary in the second force image.

The controller 130 can thus generate a set of smooth splines (or a set of parametric models of smooth splines), including: a first set of smooth splines (or parametric models) in a plane parallel to the X-axis of the touch sensor; and a second set of smooth splines (or parametric models) parallel to the Y-axis of the touch sensor no and intersecting splines in the first set of splits. Based on the known real locations of each row and column of active sense electrodes in the touch sensor, the controller 130 can assemble the first and second sets of splines (or parametric models) into one virtual three-dimensional surface mesh representing force magnitudes (or "3D force surface mesh")—over a base-line—of one or more discrete inputs on the touch sensor surface 122 over each active sense electrode in the touch sensor 110 and interpolated applied force magnitudes between these active sense electrodes for the single scan cycle, as shown in FIG. 1. The controller 130 can also correct smooth splines (or parametric models defining these splines) by applying a rule that overlapping splines in the 3D force surface mesh must intersect and by applying a rule that broad regions in the 3D force surface mesh of similar force magnitudes near a baseline force magnitude must intersect a single common plane.

6.1 Definite Input Types

Blocks of the method S110 recite: at a first time, scanning an array of sense electrodes arranged under the touch sensor surface at a first resolution to generate a first force image in Block S110; detecting a first force input in the first force image in Block S112; in response to a first geometry dimension of the first force input exceeding a first threshold, characterizing the first force input as a non-stylus input type in Block S120. Generally, the controller 130 can be configured to: scan sense electrodes; detect inputs; and, based on geometrical properties and force magnitudes of the inputs, classify the inputs as a stylus, a non-stylus, a possible stylus, or a possible non-stylus.

Figure 6:
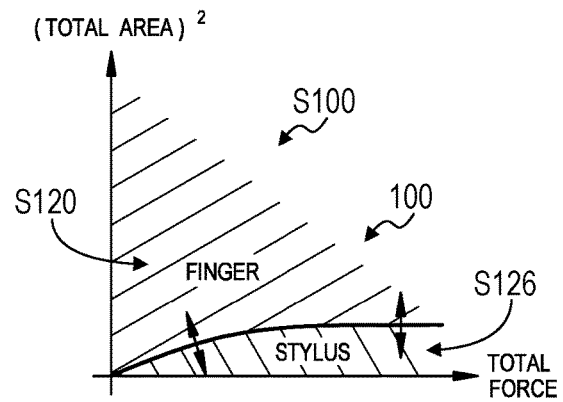
FIG. 6 is a graphical representation of one variation of the system.

The controller 130 can identify one or more discrete regions of the 3D force surface mesh indicating applied force magnitudes greater than a (static or rolling) baseline force magnitude and characterize each of these discrete regions in Block S112. For example, for one discrete region in the 3D force surface mesh indicating an applied force, the controller 130 can: identify a peak force magnitude represented in this discrete region; define an area of interest within this discrete region bounded by force magnitudes of a particular fraction (e.g., 10%) of the peak force magnitude or bounded by force magnitudes exceeding a common baseline force by a threshold force magnitude (e.g., 0.01N); calculate the area of this area of interest; and then integrate the total force represented in the 3D force surface mesh within this area of interest, as shown in FIG. 1. The controller 130 can then: calculate a ratio of peak force to area for this discrete region; access an peak-force-to-area model defining characteristic differences in the applied force area and peak applied force for stylus inputs and non-stylus inputs; and match the calculated peak-force-to-area ratio for this discrete region to a labeled division within the peak-force-to-area model to determine whether the object in contact with the touch sensor surface 122 over the discrete region during the scan cycle is resembles a stylus or a finger. For example, if the area of this discrete region is less than a threshold area defined in the peak-force-to-area model for the peak force represented in the discrete region, the controller 130 can characterize the input over a region of the touch sensor surface 122 corresponding to this discrete region as a stylus input; similarly, if the area of this discrete region is greater than the threshold area for the peak force represented in the discrete region, the controller 130 can characterize this input as a non-stylus input, as shown in FIG. 6.

Figure 5:
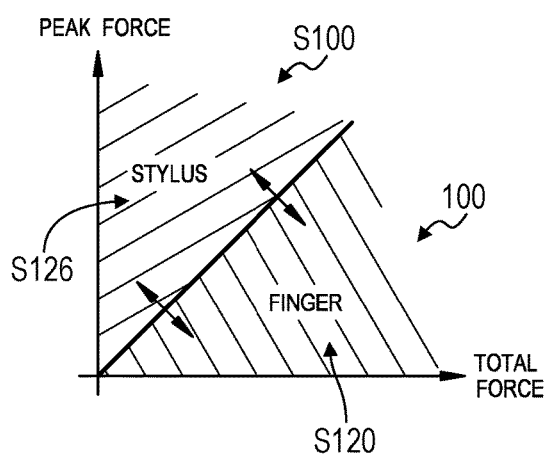
FIG. 5 is a graphical representation of one variation of the system.

The controller 130 can additionally or alternatively: calculate a ratio of area to total force for this discrete region; access an total-force-to-area model defining characteristic differences in the applied force area and total applied force for stylus inputs and non-stylus inputs; and match the calculated total-force-to-area ratio for this discrete region to a labeled division within the total-force-to-area model to determine whether the object in contact with the touch sensor surface 122 over the discrete region during the scan cycle resembles a stylus or a finger, as shown in FIG. 1. Furthermore, the controller 130 can: calculate a ratio of peak force to total force for this discrete region; access a peak-force-to-total-force model defining characteristic differences in the peak applied force and the total applied force for stylus inputs and non-stylus inputs; and match the calculated peak-force-to-total-force ratio for this discrete region to a labeled division within the peak-force-to-total-force model to determine whether the object in contact with the touch sensor surface 122 over the discrete region during the scan cycle is resembles a stylus or a finger, as shown in FIG. 5. The controller 130 can thus extract force and area data from a discrete region of the 3D force surface mesh generated from contact resistance data (indicative of applied force magnitude) read from a set of sense electrodes in the touch sensor 110 to characterize the object in contact with the touch sensor surface 122 over these sense electrodes as one of a stylus or a finger. The controller 130 can then repeat this process for each other discrete region—representative of a force input on the touch sensor surface 122—in the 3D force surface mesh.

In another implementation, the controller 130 can: detect a force input from the 3D surface mesh generated from contact resistance data; as described below, generate a force image representing the force input and the 3D surface mesh; calculate a geometry dimension (e.g., an input area, a diameter, a width, and/or a length) of the force input; and, in response to the geometry dimension of the force input exceeding a threshold, characterizing the first force input as a non-stylus input type in Block S120. Generally, the controller 130 can characterize an input as definitely one of a stylus or non-stylus based on a geometrical dimension, such as an area or a length.

In particular, the controller 130 can calculate a best-fit geometry (e.g., an ellipse) that characterizes an area of the 3D surface mesh coincident the force input and, thus, coincident a region of the 3D surface mesh in which force values exceed a minimum force threshold. Thus, the controller 130 can generalize a geometry of the input to approximate an area of the input against the touch sensor surface 122.

For example, the controller 130 can calculate a best-fit ellipse (or circle, polygon, and/or any other geometrical shape) encompassing the force input in a force image depicting the 3D surface mesh. The controller 130 can then extract a geometry dimension, such as a length of a major axis of the ellipse or a length of a minor axis of the ellipse. In response to the length of the major axis of the ellipse exceeding a threshold length, the controller 130 can characterize the force input as a (definite) non-stylus input, such as a palm input, as any input applied to the touch sensor surface is distributed across a dispersed area larger than a relatively concentrated area expected from a (definite) stylus input. As described below, the controller 130 can characterize the input as a possible stylus input in response to the length of a major axis of the best-fit ellipse remaining below the threshold; and, thus, rescan the array of sense electrodes at a higher resolution to generate a second force in response to characterizing the first input as the possible stylus input.

Additionally or alternatively, the controller 130 can also define a contiguous boundary encompassing (i.e., surrounding) force values defined in the 3D surface mesh and/or in the force image that exceed a minimum force threshold, the contiguous boundary outlining the best-fit geometry of the force input and/or outlining pixels of the force image in which force values exceed a threshold force magnitude. In response to a length (e.g., circumference) of the contiguous boundary and/or area enclosed within the contiguous boundary exceeding a threshold, the controller 130 can characterize the force input defined by the contiguous boundary as a non-stylus input (e.g., a finger input).

However, the controller 130 can characterize definite force input types in any other suitable way by any other means.

6.4 Touch Image Labeling

The controller 130 can then label each discrete region within a two-dimensional touch (or force) image—representing force magnitude values read from the touch sensor no during the scan cycle—with an object type thus determined, as shown in FIGS. 1 and 2. The controller 130 can also calculate a confidence score for each determined input type—such as based on proximity to a boundary with another input type in the peak-force-to-area model, total-force-to-area model, and/or peak-force-to-total-force model—and label each discrete region within the two-dimensional touch image with a confidence score. Furthermore, in the foregoing implementation, the peak-force-to-area model, total-force-to-area model, and/or peak-force-to-total-force model can also define regions representing objects of other types, such as a palm, a paintbrush, a finger contacting a raised or rigid overlay placed over the touch sensor surface 122, etc.

6.5 Indefinite Input Types

As shown in FIG. 2, Blocks of the method S100 recite: in response to the first geometry dimension of the first force input remaining below the first threshold: at a second time succeeding the first time, scanning a subset of the array of sense electrodes at a second resolution greater than the first resolution to generate a second force image, the subset of the array of sense electrodes coincident the first force input in Block S122; detecting a second force input in the second force image proximal the first force input in Block S124; and, in response to a ratio of a force magnitude of the second force input to a second geometry dimension of the second force input exceeding a second threshold, characterizing the first force input as a stylus input type in Block S126. As described above, the controller 130 is configured to classify a force input as one of a definite or indefinite non-stylus input type in Block S120. Generally, the controller 130 is configured to classify initially indefinite force inputs as one of the stylus and non-stylus input types.

Figure 7:
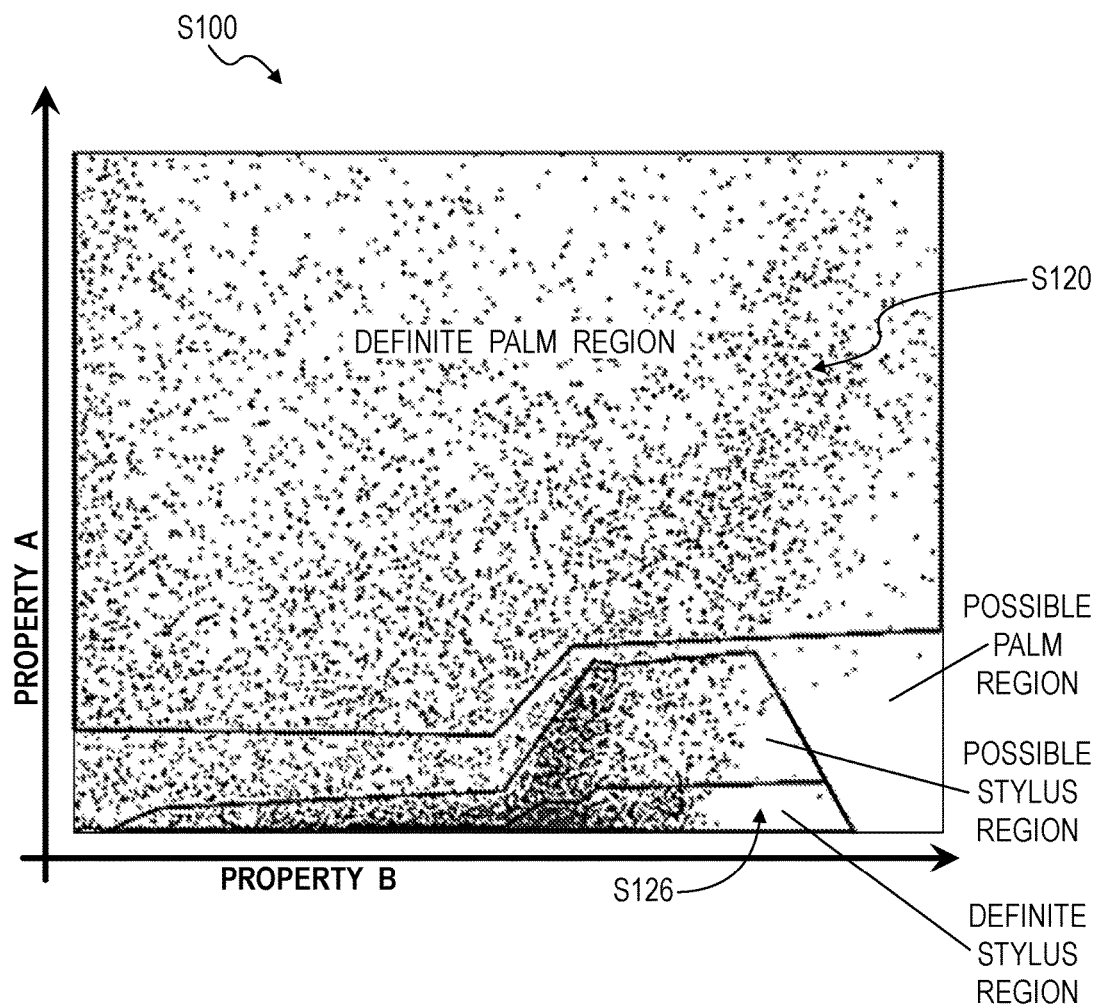
FIG. 7 is a graphical representation of one variation of the system.

In particular, in response to detecting an indefinite input type, the controller 130 is configured to scan sense electrodes of the array of sense electrodes at a higher resolution to confirm, with a lower degree of measurement error, the geometrical dimension of the force input and a force magnitude of the force input and, from more accurate geometrical dimension and force magnitude data, classify the input as one of the stylus or non-stylus input types. The controller 130 implements the foregoing methods and techniques to compare features extracted from an input area represented in the 3D force surface mesh—such as total force, peak force, total area, input velocity, etc.—to a virtual model (e.g., a virtual plot) defining discrete areas representing ratios of these features for which various input types are highly likely (e.g., "definitive") and less likely (e.g., "indefinite), and/or unknown, such as shown in FIG. 7.

For example, the controller 130 can calculate an area of a discrete input (or an area of an ellipse approximating the area of the discrete input or a composite of the major and minor axes of an ellipse approximating the area of the discrete input) and a peak force within this discrete input represented in a 3D force mesh surface generated during one scan cycle, as described above. The controller 130 can then access a first virtual plot (or a like virtual model) representing total area versus peak force in multiple plot regions: for which a stylus input type is definite (e.g., for a confidence interval greater than 95%); for which a stylus input is possible (e.g., for a confidence interval less than 95% for a stylus input type, or for a confidence interval greater than 50% for a finger, palm, or knuckle input type); for which a finger, palm, or knuckle input is possible (e.g., for a confidence interval less than 95% for a stylus input type, or for a confidence interval greater than 50% for a finger, palm, or knuckle input type); and for which a finger, palm, or knuckle input type is definite (e.g., for a confidence interval greater than 95%), as shown in FIG. 7. In this example, if the total area and peak force of the discrete input fall within the definitive stylus region of the first virtual plot, the controller 130 can label the discrete input as a stylus-type input within a touch image corresponding to the current scan cycle; the controller 130 can also track the same input area over a subsequent sequence of scan cycles and persist the stylus label throughout subsequent corresponding touch images; a connected computing device can handle the discrete input accordingly as a stylus input. Similarly, if the total area and peak force of the discrete input fall within the definitive finger, palm, or knuckle region of the first virtual plot, the controller 130: can label the discrete input as a finger-, palm-, or knuckle-type input within a touch image corresponding to the current scan cycle; and track the same input area over a subsequent sequence of scan cycles and persist the finger-, palm-, or knuckle-type input label throughout subsequent corresponding touch images. A connected computing device can handle the discrete input accordingly as a finger, palm, or knuckle input.

However, if the total area and peak force of the discrete input fall within the possible stylus region of the first virtual plot, the controller 130 can label the discrete input as possibly a stylus; similarly, if the total area and peak force of the discrete input fall within the possible finger, palm, or knuckle region of the first virtual plot, the controller 130 can label the discrete input as possibly not a stylus. The controller 130 can track the same input implement using similar methods and techniques to label the input across multiple succeeding scan cycles. The controller 130 can then confirm that the input is a stylus type in input if the input is labeled as possibly a stylus (i.e., contains features that fall within a possible stylus region of a virtual plot) at least a first threshold number of times (e.g., ten times) before the input area is labeled as possibly not a stylus (i.e., contains features that fall within a possible finger, palm, or knuckle region of the virtual plot) a second number of times (e.g., five times) over the sequence of scan cycles; and retroactively label the discrete input—tracked across the sequence of scan cycles—as a stylus-type input in each corresponding touch image accordingly. Similarly, the controller 130 can: confirm that the discrete input is a not stylus after the input area is labeled as possibly not a stylus at least a threshold number of times (e.g., five times); and retroactively label the discrete input—tracked across the sequence of scan cycles—as not a stylus-type input (or as a finger-, palm-, or knuckle-type input) in each corresponding touch image accordingly.

If the total area and peak force of the discrete input fall within the possible stylus region of the first virtual plot, the controller 130 can additionally or alternatively compare other features of the touch input to additional virtual plots to confirm whether the discrete input is a stylus-type input. In particular, the controller 130 can implement additional virtual plots comparing other combinations of features of the discrete input detected during a scan cycle. For example, if the total area and peak force of the discrete input fall within the possible stylus region of the first virtual plot, the controller 130 can implement similar methods and techniques to compare one or more combinations of: total force, initial force, peak force, total area, directional velocity, directional acceleration, force velocity, contact dynamics (e.g., changes in size of the input area), deviation from an ellipse, asymmetry around a force peak, etc. to corresponding virtual plots (or like virtual models) to label the discrete input as one of a definitively a stylus, possibly a stylus, or definitively a finger, palm, or knuckle. The controller 130 can repeat this process until a definite determination is reached for the input area, and the controller 130 can label the discrete input accordingly. The controller 130 can thus characterize a discrete input on the touch sensor surface 122 based on a prioritized set of features extracted from data collected during the corresponding scan cycle for "borderline" cases in which a single primary feature set (e.g., area versus peak force) of the input returns an indefinite result.

The controller 130 can also: track a discrete input across a sequence of scan cycles; confirm that the discrete input is a stylus only after the input area is labeled as definitively a stylus (i.e., contains features that fall within a definite stylus region of a virtual plot) at least a first threshold number of times (e.g., ten times) before the input area is labeled as definitively not a stylus (i.e., contains features that fall within a definite finger, palm, or knuckle region of the virtual plot) a second number of times (e.g., five times) over the sequence of scan cycles; and retroactively label the discrete input—tracked across the sequence of scan cycles—as a stylus-type input in each corresponding touch image accordingly. Similarly, the controller 130 can: track a discrete input across a sequence of scan cycles; confirm that the discrete input is a not stylus only after the input area is labeled as definitively not a stylus at least a threshold number of times (e.g., five times); and retroactively label the discrete input—tracked across the sequence of scan cycles— as not a stylus-type input (or as a finger-, palm-, or knuckle-type input) in each corresponding touch image accordingly.

For example, the controller 130 can, at a first time, detect a first force input with force values exceeding a force threshold coincident a first location in a first force image corresponding to a first subset of sense electrodes. At a second time succeeding the first time (e.g., 0.1 seconds later), the controller 130 can scan the array of sense electrodes and generate a second force image. The controller 130 can then detect a second force input with force values exceeding the force threshold coincident a second location in the second force image corresponding to a second subset of sense electrodes remote from (i.e., offset from) the first subset of sense electrodes. In response to the ratio of an input area to a force magnitude of the second force input remaining approximately equal to the ratio of an input area to a force magnitude of the first force input, the controller 130 can classify the first force input and the second force input as originating from the same input body (i.e., a stylus or non-stylus) and assign to the second force input a type corresponding to the type of the first force input. Thus, for a stylus type first force input, the controller 130 can assign a stylus type to the second force input. Likewise, for a non-stylus first force input, the controller 130 can assign a non-stylus type to the second force input.

The controller 130 can also implement pattern recognition to label a cluster of (discrete or overlapping) inputs as a palm and/or knuckle and to label a single discrete input offset from the cluster of inputs as a stylus, such as if the discrete input is to the left of the cluster of inputs if the user is right-handed or to the right and down from the cluster of inputs if the user is left-handed. The controller 130 can also implement the classification methods described above through machine-learning or neural-network based classification systems such as linear classifiers, support vector machines, kernel estimation (k-nearest neighbor), decision trees, random forests, neural networks, and/or deep learning, etc.

6.5 Inactive Pixels

In one variation in which the touch sensor 110 includes inactive sense electrodes (i.e., sense electrodes not read by the controller 130) interposed between adjacent active sense electrodes, as described in U.S. patent application Ser. No. 14/499,001, a change in contact resistance of the resistive layer 116 over one inactive pixel map can affect the contact resistance signal output by an adjacent active pixel. For example, in this variation, the touch sensor no can include a grid array of active and inactive sense electrodes at a sense electrode pitch of one millimeter with active pixels arranged at an active sense electrode pitch of two millimeters. The controller 130 can therefore apply an active-inactive sense electrode coupling model to normalize (or "correct") the contact resistance value (representative of the applied force) read from the active sensor and to interpolate a contact resistance value (or a force magnitude) for the inactive pixel. In particular, the controller 130 can "redistribute" a total applied force detected by the active pixel to one or more (e.g., four) adjacent inactive sense electrodes based on the original force value calculated for the active sense electrode during the scan cycle. The controller 130 can then implement the foregoing methods and techniques to transform these corrected and interpolated force magnitude values into a 3D force surface mesh for one scan cycle and to characterize inputs detected within discrete regions within the 3D force surface as a stylus input type or non-stylus (e.g., a finger or a palm) input type, as shown in FIG. 1.

In another variation in which a (light) input on the touch sensor surface 122 yields a measurable change in the output of a single particular sense electrode only, the controller 130 can determine that the total force magnitude of this force is less than a known threshold magnitude force for which a measurable force is communicated into two or more sense electrodes. In this variation, the controller 130 can also determine that the center of the force area applied to the touch sensor surface 122 must fall within a region of the touch sensor 110 bounded by a perimeter half the distance from the particular sense electrode to adjacent sense electrodes. The controller 130 can thus characterize the input object as "sharp" (e.g., as a stylus) and interpolate a position and a force magnitude of this (light) input based on: a predefined maximum possible force input magnitude known to trigger only one sense electrode; a boundary around the sense electrode in which the centroid of the applied force may occur; the output of the particular sense electrode; and a ratio or model of force spreading across the resistive layer 116 from one sense electrode to an adjacent sense electrode. In this variation, the controller 130 can combine the foregoing methods to detect and distinguish both light and heavier inputs by stylus and fingers on the touch sensor surface 122.

6.6 Resolution

As described above, the controller 130 can implement Blocks of the method S100 to record an initial scan at a first time of the array of sense electrodes at a first resolution (e.g., half of the natural resolution of the array of sense electrodes). At a second time succeeding the first time (e.g., 1 millisecond after the first time), the controller 130 can scan a subset of the array of sense electrodes at a second resolution (e.g., the natural resolution) greater than the first resolution to generate the second force image in Block S122. Generally, the controller 130 can be configured to scan the array of sense electrodes at a lower resolution until an indefinite input is detected and locally increase resolution around the indefinite input to facilitate classification of the indefinite input as one of the stylus and non-stylus input types.

Figure 10A:
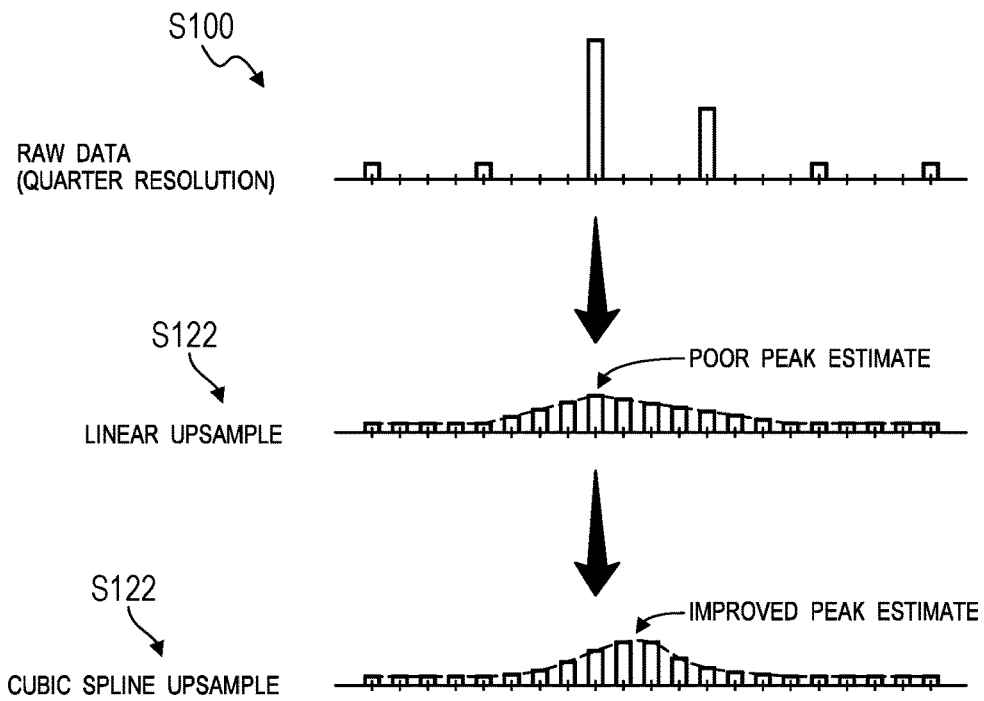
FIGS. 10A and 10B is a flowchart representation of one variation of the method.
Figure 10B:
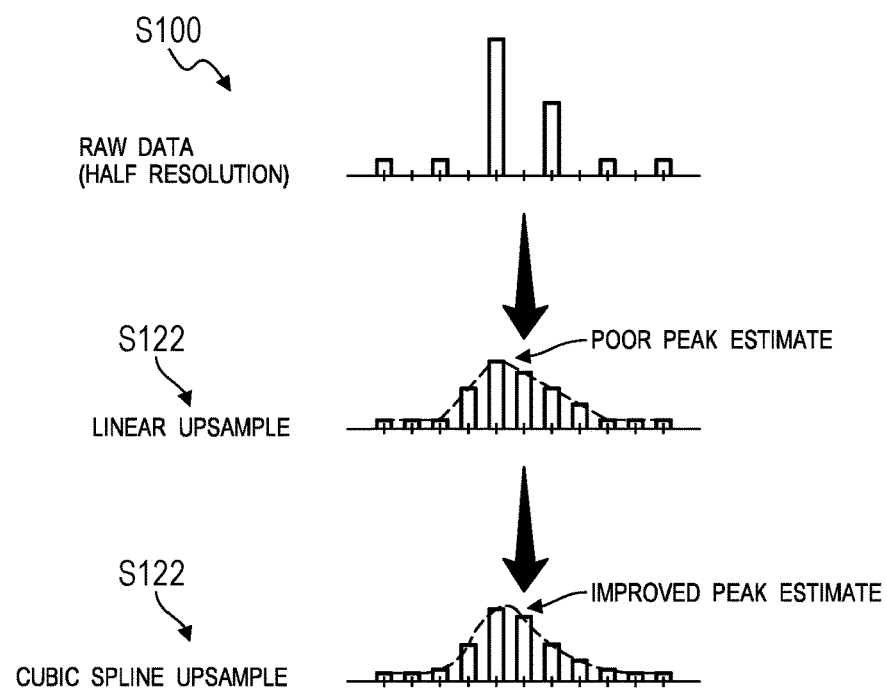

In particular, the controller 130 can scan, at a first resolution a subset of rows and a subset of columns of the array of sense electrodes 114 to generate the first force image as shown in FIGS. 10A and 10B. For example, the controller 130 can scan every second row and every second column of the array of sense electrodes 114 to generate the first force image. The controller 130 can scan at the first resolution until the controller detects an input, such as an indefinite input, within a force image.

In response to detecting an indefinite input—an input with a force magnitude to area ratio remaining below the threshold ratio and/or an input with a geometry dimension remaining below a threshold geometry dimension, the controller 130 can then scan a subset of the array of sense electrodes 114—such as sense electrodes coincident the first force input, within the contiguous boundary, within a threshold distance of offset and outside the contiguous boundary, etc.—to generate a second force image. In particular, the controller 130 can increase a scan resolution proximal (or coincident) the first force input and/or across the entire array of sense electrodes 114 by scanning more rows and more columns of the array of sense electrodes than the controller 130 scanned to generate the first force image. For example, in response to detecting a force input characterized by an ellipse with a major axis of a length exceeding a predefined threshold length (e.g., 0.75 cm), the controller 130 can characterize the force input as indefinite and rescan sense electrodes of the array of sense electrodes coincident (i.e., encompassed by) the ellipse at a higher resolution to generate a second force image, thereby improving accuracy of force magnitude and contact area of the force input in the second force image.

Furthermore, the controller 130 can additionally or alternatively read a set of raw force values from rows and columns of sense electrodes at the first resolution; interpolate between force values in the set of raw force values to generate a set of interpolated force values; and compile the set of raw force values and the set of interpolated force values into the second force image. Thus, as shown in FIGS. 10A and 10B, the controller 130 can upsample an existing force image to a higher resolution to improve accuracy of force magnitudes (e.g., peak force) and locations of inputs within a force image. In particular, the controller 130 can transform a force image, such as the second force image, by interpolating force values between rows and columns of the second force image, the virtual image characterized by a resolution greater than the second resolution at which the second force image was generated. Generally, in this variation, the controller 130 can be configured to interpolate between force values detected by sense electrodes in the array of sense electrodes to improve accuracy of force magnitudes (e.g., peak force) coincident an input. For example, a maximum force value can occur between two rows of sense electrodes. By interpolating force values, the controller 130 can approximate an intermediate force value between the two rows of sense electrodes. Thus, the controller 130 can calculate the force magnitude for the force input defined by a maximum force value within the force image. Similarly, the controller 130 can interpret a contiguous cluster of force values, in the set of raw force values and the set of interpolated force values, exceeding a force threshold as the second force input to calculate a geometry dimension (e.g., an area, ellipse, major axis, etc.) within the force image to reduce error of the geometry dimension by increasing resolution of data sampled from the array of sense electrodes.

However, in one variation of the method S100, the controller 130 can maintain a fixed resolution in response to detecting an indefinite input type. In particular, the controller 130 can: at a first time, scan an array of sense electrodes at a first resolution to generate a first force image; detect a first force input in the first force image; in response to a first geometry dimension of the first force input exceeding a first threshold, characterize the first force input as a non-stylus input type; in response to the first geometry dimension of the first force input remaining below the first threshold; in response to a ratio of a force magnitude of the first force input to a second geometry dimension of the first force input exceeding a second threshold, characterize the first force input as a stylus input type; in response to the ratio falling below the second threshold, characterize the first force input as a non-stylus input type; and output, to a computing device coupled to the array of sense electrodes, a location and a type of the first force input.

However, the controller 130 can scan sense electrodes or a subset of sense electrodes in the array of sense electrodes at any other resolution in response to any other input type and/or trigger. Alternatively, the controller, 130, can scan all sensor or a subset of sense electrodes at the natural resolution of the touch sensor by default.

6.6 Real-Time and Asynchronous Input Type Identification

The controller 130 can execute the foregoing methods and techniques following each scan cycle and can output one touch image—including labeled input regions—per scan cycle. In particular, controller 130 can execute the foregoing methods and techniques in real-time during operation of the system, such as to output touch images—representing labeled inputs on the touch sensor surface 122—that can be handed by a connected computing device to update a graphical user interface in real-time. Alternatively, the controller 130 can execute the foregoing methods and techniques asynchronously, such as to post-process pen strokes applied to a piece of paper placed over the touch sensor surface 122 into a labeled sequence of touch images that can be replayed digitally by a computing device to digitally recreate content drawn manually on the paper in real space. For example, the controller 130 can execute the foregoing methods and techniques to correct, update, and/or amend input types previously output by the controller 130 in response to detecting a definite input type post de facto.

For example, the controller 130 can scan the array of sense electrodes at a first resolution to generate a first force image of the array of sense electrodes at a first time and characterize a first force input detected in the first force image as an indefinite input. At a second time following the first time, the controller 130 can scan the array of sense electrodes 114 at the first resolution to generate a third force image. The controller 130 can detect the first force input relocating from a first location to a second location across the array of sense electrodes within the third force image. In response to a geometry dimension of the first force input in the second location exceeding the threshold, the controller 130 can characterize the first force input as a (definite) non-stylus input type. However, in response to the geometry dimension of the first force input remaining below the threshold, the controller can again scan a subset of the array of sense electrodes at a second resolution greater than the first resolution to generate a fourth force image. In response to a type of the first force input in the first force image differing from a type of the first force input in the third force image, the controller 130 can (retroactively) update a type of the first force input in the first force image differing from a type of the first force input in the third force image.

For the system that executes the foregoing methods and techniques in real-time, upon identification of a force input on the touch sensor surface 122 labeled as "possibly a stylus," the system can also show a hovering cursor at a location on a connected display corresponding to the location of the input on the touch sensor surface 122. As additional force is applied to the touch sensor surface 122, the system can confirm the input as a stylus and then update the state of the cursor shown on the display from a hovering cursor to a cursor that is actively drawing according to motion of the input across the touch sensor surface 122. Thus, the presence of the indefinite state can be hidden from the user or exposed as a "feature" rather than a limitation to aid the user in orienting the stylus on the touch sensor surface 122 (or on the display arranged over the touch sensor surface 122) screen before beginning to draw the stylus across the touch sensor surface 122.

For example, the controller 130 can, in response to a ratio of a force magnitude of a force input to an input area of the force input falling within a window less than a threshold ratio, characterize the force input as a hover input type.

Then the controller 130 can output a cursor location and a specification of the first force input as a hover input type in response to the second force magnitude exceeding a force threshold and remaining below an intentional input threshold. However, in response to the ratio falling below the window, such that the ratio of the input is well below the threshold ratio, the controller 130 can characterize the force input as a (definite) non-stylus input type.

However, the controller can implement the foregoing methods and techniques to asynchronously update (or amend) input type classifications in any other way.

7. Multi-Touch

Once a touch image is generated and labeled, the controller 130 (or a computing device coupled to the system and receiving touch images from the controller 130 can respond to inputs represented in the touch image, such as by manipulating a cursor, entering a keystroke, or executing a stylus vector.

In instances in which a touch image includes representations of multiple inputs of two or more distinct types, the controller 130 (or the connected computing device) can selectively handle these inputs of different types. For example, if both an input area labeled as a stylus input and a large input area labeled as a finger (which may correspond to a palm input) (or an input area labeled directly as a palm) are contained within the touch image with their centroids (or locations of peak force) within a threshold distance from each other (e.g., three inches), the controller 130 can reject the large finger (or palm) input and instead respond to the stylus input only. (Alternatively, the controller 130 can strip the large finger input from the touch image.) The controller 130 can also track such a stylus input and large finger (or palm) input over time (i.e., across a sequence of touch images), and can maintain rejection of this large finger input in subsequent touch images following removal of the stylus from the touch sensor surface 122 indicated in a touch image, such as for a sequence of touch images generated over a period of two seconds following detected release of the stylus from the touch sensor 110 input in order to implement hysteresis and to limit rapid reprioritization of stylus and large finger (or palm) inputs while a user is drawing or writing on the touch sensor surface 122 with the stylus.

In another example, if a large finger (or palm) input is represented in a touch image, the controller 130 can prioritize scanning of a set of sense electrodes within and around the corresponding touch area (e.g., within two inches of the perimeter of the detected touch area) in subsequent scan cycles. In this example, the controller 130 can selectively increase the scan rate of this set of sense electrodes (e.g., to a rate of 250 Hz) and/or reduce the scan rate of other sense electrodes in the touch sensor 110 (e.g., to 60 Hz) in order to maintain sensitivity to a possible stylus input near the large finger (or palm) input while reducing power consumption and processing load needed to scan other sense electrodes in the touch sensor.

However, the controller 130 (or a computing device connected to the system) can handle touch images containing object type labels in any other way.

7.1 Distinguishing Classes of Objects

The systems and methods described herein can more generally be implemented to distinguish two or more classes of objects on the touch sensor surface 122 that vary in terms of sharpness of their pressure distributions. For example, the system can distinguish 1) a finger from a palm, 2) a stylus from a knuckle, 3) a finger from a knuckle, 4) a nail from a finger, 5) a stylus from a finger and a palm 6) a stylus from a knuckle, a finger, and a palm, and/or 7) a nail from a knuckle, a finger, and a palm, etc. In an industrial sensing application, the system can detect particles caught below a smooth surface or non-uniformity causing a sharp pressure point. In a robotics application, the system can be used to protect a robot from injury by grasping or pushing against sharp or pointed objects or to detect a condition in which the robot may be in danger of being damaged by a sharp or pointed object. In a medical application, the system can be used to detect a pressure point on a bed or other surface in contact with a patient's body that may cause injury to the patient over time.

Although the foregoing system is described herein as implementing resistive approaches to measure pressure distributions across a touch sensor surface, the system can implement similar methods and techniques to measure pressure distributions across a touch sensor surface through capacitive, optical, MEMS, and/or other types of force sensing arrays. The system can also incorporate other force-distribution layers and employ other methods and algorithms to distinguish a stylus from a finger and/or objects in contact with a touch sensor surface.

7.2 Proximal Inputs

In one implementation, the controller 130 can generate a first force image; detect and characterize a first force input, in the first force image, as a (definite) stylus or non-stylus input type; detect, in the first force image, a second force input within a threshold distance of the first force input; and, characterize the second force input as a non-stylus input type. Generally, the controller 130 can define a threshold boundary surrounding a definite input (e.g., a palm input and/or a stylus input) and reject additional inputs within the threshold boundary as aberrant and/or non-stylus inputs.

For example, the controller 130 can detect a first input distributed over a relatively large area of the touch sensor surface in a first force image. In response to a geometry dimension of the first input exceeding—by a large margin—a threshold dimension roughly the size of a stylus input, the controller 130 can characterize the first input as a non-stylus (and/or palm) input type. Then the controller 130 can define a keep-out zone surrounding the first input's large area in the first force image and within a threshold distance of a contiguous boundary defining the large area of the first input. In response to detecting additional inputs coincident the keep-out zone and/or coincident the first force input, the controller 130 can characterize the additional inputs as non-stylus inputs. Thus, the controller 130 can characterize the additional inputs as non-stylus inputs on account of proximity to the first force input and low probability (e.g., determined from a confidence score) that the additional inputs result from contact of a multiple (additional) styluses within a predefined area of the stylus input.

8. Input Tracking

The controller 130 can track inputs across the array of sense electrodes 114 over a sequence of scan cycles and persist the stylus label or the non-stylus label throughout subsequent corresponding touch images. In particular, in response to detecting a set of similar inputs defining similar geometries or geometry dimensions, force-to-area ratios, and/or other metrics in sequential force images, the controller 130 can maintain a first label characterized for a first input in the set of similar inputs to all inputs in the set of similar inputs.

For example, the controller 130 can detect relocation of a first force input from a first location to a second location adjacent the first location in response to detecting a first force input in a first force image at a first time. The first force input can define a first ratio of a force magnitude of the first force input—calculated as described above—to a geometry dimension (e.g., an area). At a second time succeeding the first time, the controller 130 can detect a second force input in a second force image proximal a location of the first force input in the first force image. The second force input can define a second ratio of a second force magnitude of the second force input to a second geometry dimension (e.g., an area) of the second force input. In response to the first ratio remaining approximately equal to the second ratio, the controller 130 can characterize (or label) the second force input to align with a label (or type) of the first force input. Thus, the controller 130 can label a second force input as a stylus type in response to detecting a first force input of a stylus type. Likewise, the controller 130 can label a first force input as a non-stylus type in response to detecting a first force input of a non-stylus type.

9. Handwriting Posture

Figure 8:
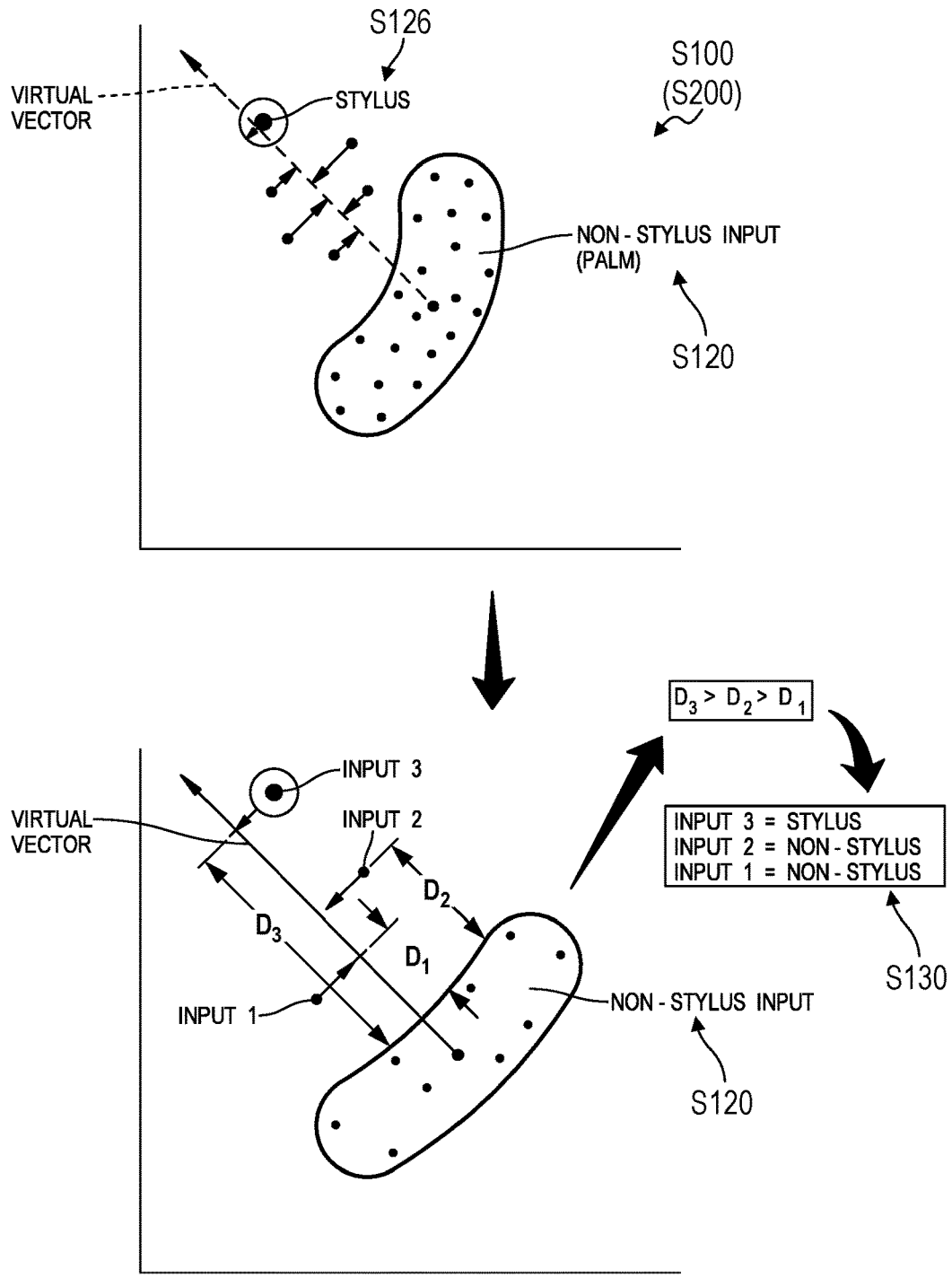
FIG. 8 is a flowchart representation of one variation of the method.

In one variation shown in FIG. 8, the controller 130 can implement methods and techniques of method S100 to determine a handwriting posture of a user and, based on the handwriting posture, characterize inputs as stylus and non-stylus input types. Generally, the controller 130 can learn input patterns and efficiently characterize input types according to learned input pattern labels.

For example, the controller 130 can, at a first time, in response to a force-to-area remaining below the threshold magnitude, characterize a first force input, in a first force image, as a palm input type; detect, in the first force image, a second force input offset from the first force input; and in response to a second force-to-area ratio of the second force input exceeding the second threshold, characterize the second force input as the stylus input type. The controller 130 can then define a virtual vector from the first force input to the second force input, the virtual vector representing a handwriting posture of a user. Over a time window (e.g., 5 minutes) succeeding the first time, the controller 130 can scan the array of sense electrodes and project the virtual vector onto force images generated by the controller 130 during the time window. In response to detecting a palm input in a force image generated during the time window, the controller 130 can project the virtual vector onto the force image such that an origin of the virtual vector aligns with the palm input (e.g., a centroid of the palm input). The controller 130 can detect a set of additional force inputs (e.g., a second and a third force input) in the force image. The controller 130 can then project (i.e., orthogonally) the second and third force inputs onto the virtual vector. The controller 130 can then characterize each of the second and third force inputs based on a distance of the second and third inputs from the palm input. In response to the second force input falling further away from the palm input on the virtual vector than the third force input, the controller 130 can characterize the second force input as a stylus input type and the third force input as a non-stylus input type and/or indefinite input. Thus, the controller 130 can efficiently label inputs by projecting inputs onto a virtual (hand-writing posture) vector and characterize a furthest of inputs detected within a force image as a stylus input as shown in FIG. 8.

However, the controller 130 can implement any other method and/or technique to label and characterize inputs in any other suitable way.

10. Glove Input Mode

Figure 9:
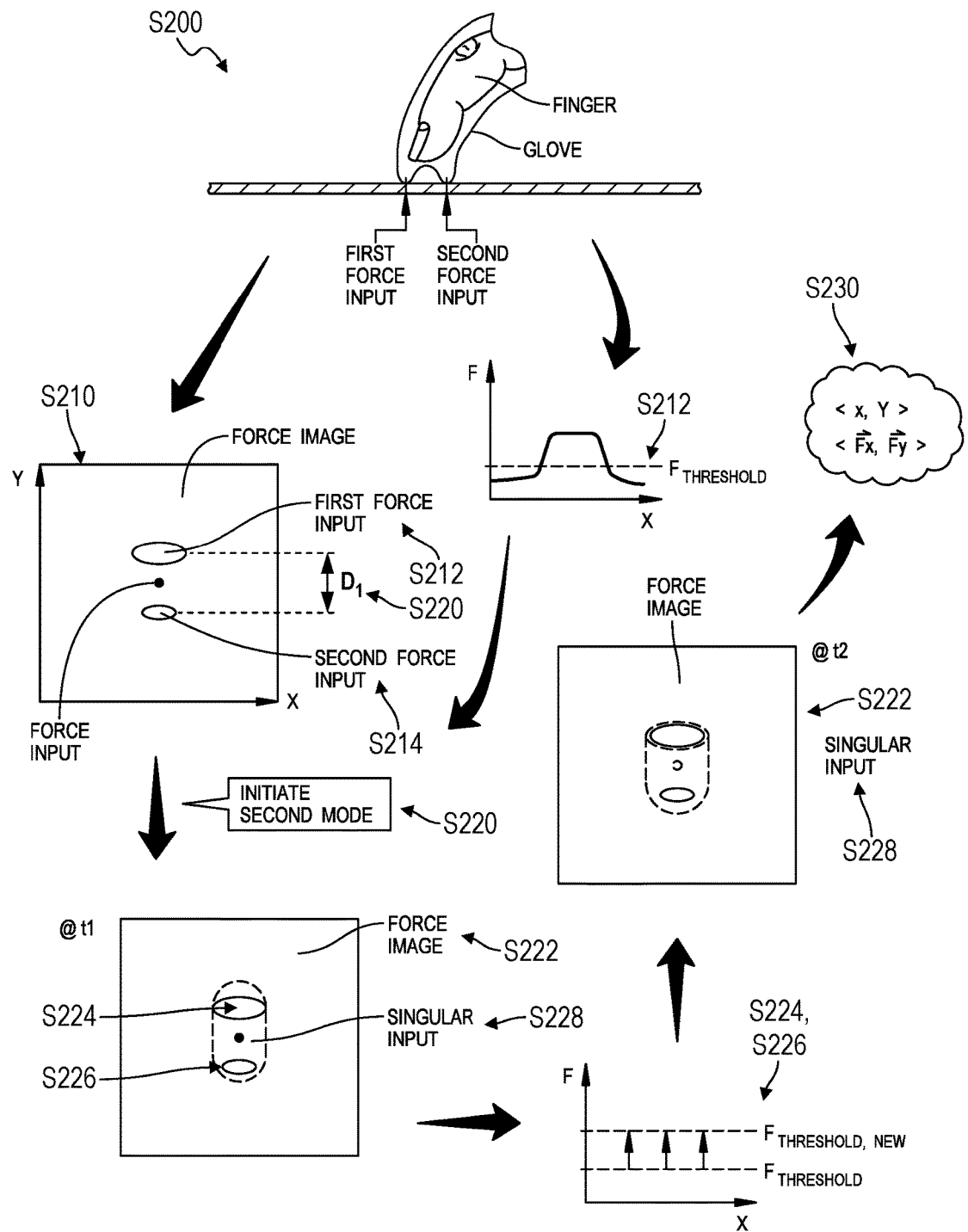
FIG. 9 is a flowchart representation of one variation of the method.

As shown in FIG. 9, a method S200 for detecting and characterizing inputs on a touch sensor surface includes: in a first mode, at a first time, scanning an array of sense electrodes, arranged under the touch sensor surface, to generate a first force image in Block S210; interpreting a first force value in the first force image that exceeds a first force threshold as a first force input at a first location on the touch sensor surface in Block S212; interpreting a second force value in the first force image that exceeds the first force threshold as a second force input at a second location on the touch sensor surface in Block S214; in response to the second location falling within a threshold distance of the first location, entering a second mode in Block S220; in the second mode: at a second time succeeding the first time, scanning the array of sense electrodes to generate a second force image in Block S222; interpreting a third force value in the second force image that exceeds a second force threshold greater than the first force threshold as a third force input at a third location on the touch sensor surface in Block S224; interpreting a fourth force value in the second force image that exceeds the second force threshold as a fourth force input at a fourth location on the touch sensor surface in Block S226; in response to the third location falling within a threshold distance of the first location, merging the third force input and the fourth force input into a singular input defining a singular input area encompassing the third force input and the fourth force input and characterized by a singular input force magnitude representing a combination of the third force value and the fourth force value in Block S228; and outputting, to a computing device connected to the input device, the singular input area and the singular input force magnitude of the singular input in Block S230.

Generally, the controller 130 can execute Blocks of the method S200 to initiate a glove-input detection mode in which the controller 130 can interpret close (i.e., proximal) clusters of inputs within a force image as a singular input by a gloved finger. Gloves, such as loose-fitting gloves, may tend to bunch up around a tip of a finger and, thus, when a user wearing a glove contacts a touch sensor surface to apply an input, the loose-fitting glove may intersect with the touch sensor surface at multiple discrete points. Some gloves may also have seams or stitching around the fingertip areas which may also create contact on the sensor surface at multiple discrete points. For example, a user may wear a heavy work-glove while interacting with a touchpad integrated into a computing device. Thus, the controller 130 can detect multiple discrete inputs within a force image captured at a time corresponding to the glove's input on the touch sensor surface. To facilitate accurate detection and location of inputs to a touch sensor surface in surgical, military, outdoor, and/or any other application in which a user may wear a glove or apply inputs with any other uneven (e.g., wrinkled, non-planar, or lumpy) input utensil, the controller 130 can aggregate closely proximal inputs as a singular input rather than interpreting each discrete input as a distinct input.

In particular, the controller 130 can, as described below, flag clusters of inputs within a certain proximity as possible glove inputs, enter a glove-input mode, increase a force threshold of sense electrodes of the array of sense electrodes of the touch sensor, and, in response to detecting one or more force inputs exceeding the (new) force threshold, characterize the force inputs as a gloved-finger input type.

10.1 Switching Modes

As shown in FIG. 9, Blocks of the method S200 recite: in a first mode, at a first time, scanning an array of sense electrodes, arranged under the touch sensor surface, to generate a first force image in Block S210; detecting, in the first force image, a first force input at a first location on the touch sensor surface, the first force input of a first force value exceeding a first force threshold in Block S212; detecting, in the first force image, a second force input at a second location on the touch sensor surface, the second force input of a second force value exceeding the first force threshold in Block S214; in response to the second location falling within a threshold distance of the first location, entering a second mode in Block S220. Generally, the controller 130 can execute Blocks S210, S212, and S220 of the method S200 to trigger transition from a first (default) mode described above into a second (glove-input detection) mode in response to detecting closely clustered inputs within a force image. Thus, the controller 130 can implement Blocks of the method S100 to distinguish between closely proximal yet distinct inputs (e.g., from two adjacent fingers contacting the touch sensor surface) and proximal detected inputs resulting from multiple discrete contact points of a glove with the touch sensor surface.

In one implementation, the controller 130 can initiate the second mode in response to detecting two or more inputs within a threshold distance of each other. In this implementation, the controller 130 can associate closely proximal inputs as results from contact of a single input object at multiple discrete but closely clustered input locations along the touch sensor surface. In this implementation, the controller 130 can define the threshold distance such that the controller 130 can differentiate between closely proximal inputs resulting from contact of multiple discrete input objects (e.g., two fingers) and closely proximal inputs resulting from a single input object (e.g., a loose-fitting gloved finger) contacting the touch sensor surface at multiple discrete contact points. For example, the controller 130 can define the threshold distance less than a minimum distance between nearest common contact points of two adjacent fingers on the touch sensor surface when contacting the touch sensor surface.

For example, in the first mode, the controller 130 can output, to the computing device, a first location of a first force input and a second location of a second force input; and continue operation in the first mode in response to a force magnitude of the first force input to the first geometry dimension of the first force input remaining below a threshold ratio and in response to a ratio of a force magnitude of the second force input to a second geometry dimension of the second force input remaining below the threshold ratio. Thus, the controller 130 can maintain the first mode in response to detecting low-pressure (or force) and proximal inputs, such as a light palm input contacting the touch sensor surface at multiple discrete points. However, the controller 130 can enter the second mode in response to the ratio of the force magnitude of the first force input to the first geometry dimension exceeding a threshold ratio; and the second location falling within the threshold distance of the first location. Thus, if at least one input detected within a threshold distance of an other input appears to be a stylus, finger, or other localized input with a high force-to-area ratio, the controller 130 can enter the second (glove-input detection) mode.

In another implementation, as described above, the controller 130 can initiate the second mode in response to detecting discrete inputs of similar and/or distinct input types into a singular (comprehensive) input within a threshold distance of each other. In particular, the controller 130 can selectively merge discrete inputs into the singular input based on compatibility—or a complementary relationship—of input types detected within a force image. Thus, the controller 130 can characterize a set of inputs within a particular force image as a stylus input type or a non-stylus type based on a geometry dimension of each input in the set of inputs and/or a force-to-area ratio calculated for each input. Based on proximity and geometrical characteristics of each input, the controller 130 can then selectively determine whether the set of inputs originate from discrete (intentional) contact points of multiple input objects (e.g., fingers, styluses, and/or palms) on the touch sensor surface or from a singular input object with multiple discrete contact points.

For example, in response to detecting a first force input of a stylus input type within a threshold distance (e.g., less than a minimum distance between nearest common contact points of two adjacent fingers on the touch sensor surfaces) of a second force input of a stylus input type in a force image, the controller 130 can initiate the second mode. In response to proximity of the first and second force inputs and localized nature of the stylus input type, the controller 130 can identify the first and second force inputs of a stylus type as multiple contacts by a singular object, such as a gloved finger, with the touch sensor surface. Thus, as described below, the controller 130 can merge the first and second force inputs into a singular input in the second mode. In this example, the controller 130 can also, in response to detecting the first force input of a stylus input type within a threshold distance of the second force input of a stylus input type in a force image, identify the first and second force inputs as originating from multiple distinct objects contacting the touch sensor surface and, thus, remaining in the first (default) mode as described above. Likewise, in response to detecting a first force input of a non-stylus input type within a threshold distance of a second force input of a non-stylus input type in a force image, the controller 130 can characterize the first and second force inputs as distinct inputs and initiate the default mode described below.

In another implementation, in response to two (or more) inputs falling within a threshold distance of each other and exhibiting a similar input type (e.g., a non-finger input type), the controller 130 can characterize the inputs as distinct inputs, and remain in a first (default) mode as described below. However, in response to detecting multiple proximal inputs exhibiting dissimilar input types, the controller 130 can initiate the second mode. For example, in response to a ratio of a force magnitude of a first force input to a first geometry dimension of the first force input remaining below a threshold, the controller 130 can characterize the first force input as a non-palmar input type (e.g., a finger and/or a stylus input); in response to a ratio of a force magnitude of a second force input to a second geometry dimension of the second force input remaining below the threshold, the controller 130 can characterize the second force input as a non-palmar input type; and, in response to characterizing the first force input and the second force input as non-palmar input types, the controller 130 can initiate the second mode.

However, the controller 130 can initiate the second mode in response to any other trigger and/or combination of input types of proximal force inputs.

10.2 Merging Multiple Inputs

As shown in FIG. 9, Blocks of the method S200 recite: in response to the third location falling within a threshold distance of the first location, merging the third force input and the fourth force input into a singular input defining a singular input area encompassing the third force input and the fourth force input and characterized by a singular input force magnitude representing a combination of force values of the third force input and the fourth force input in Block S228. Generally, the controller 130 can execute Blocks S228 to merge clusters of closely proximal inputs into a singular input upon entering a glove-input detection mode.

In one implementation, the controller 130 can merge a first force input within a threshold distance (e.g., 1 millimeter) of a second force input in a force image into a singular input and calculate an input area of the singular input within a contiguous boundary encompassing both the first force input and the second force input. In particular, the controller 130 can define the contiguous boundary that surrounds force values, defined in the first force image, exceeding the first force threshold, thereby encompassing the first force input and the second force input. From the contiguous boundary, the controller 130 can calculate an input area encompassed by (i.e., within) the contiguous boundary.

As described above, the controller 130 can calculate an input area from a best-fit geometry overlaid on and encompassing the first and second force inputs. In particular, the controller 130 can define a best-fit geometry, such as an ellipse, circle, or polygon, to (approximately) encompass all or a majority of both the first and second force inputs in the force image. The controller 130 can then calculate an area of the best-fit geometry and assign the area of the best-fit geometry to the input area.

Additionally or alternatively, the controller 130 can calculate a force magnitude of the singular input based force values of the first and second force inputs. In one implementation, the controller 130 can define a force magnitude of the singular input based on a linear combination of force values detected coincident the first and second force inputs in the force image. In another implementation, the controller 130 can define the force magnitude of the singular input as a peak force detected in (both) of the first and second force inputs. Alternatively, the controller 130 can calculate the force magnitude of the singular input as a weighted combination of a first force magnitude of the first force input weighted by an area of the first force input and the second force magnitude of the second force input weighted by an area of the second force input.

Alternatively, the controller 130 can interpolate a force magnitude based on a gradient of force values detected coincident the first and second force inputs within the force image. For example, the controller 130 can detect that the first force input defines a first gradient of force values increasing in a direction toward the second force input. The second force input can define a second gradient of force values that decrease from an edge of the second force input adjacent the first force input in a direction distal from the first force input. Based on the first and second gradients, the controller 130 can calculate (or project) intermediate force values between the first and second force inputs by projecting trends of each of the first and second gradients onto intermediate pixels of the force image between the first and second inputs. For example, the controller 130 can define a curve (or trend line) of force values across intermediate pixels between the first and second inputs and coinciding with the first gradient and/or the second gradient. From the curve, the controller 130 can project force values between the first and second force inputs and, thus, calculate an overall force magnitude for the singular input (e.g., as a linear combination of force values of the first and second force inputs and the projected force values between the first and second inputs or as a peak force of the first and second inputs and the projected force values between the first and second inputs).

The second force input defines a second gradient of force values that increase from an edge of the second force input adjacent the first force input and decrease toward an edge of the second force input opposite the first force input. Thus, the controller 130 can detect that a peak force of the input likely occurs coincident the second force input.

In one variation, the controller 130 can interpret a contiguous cluster of force values exceeding the force threshold as force inputs and define input areas bounding the contiguous clusters of force values. Therefore, the controller 130 can calculating the singular input force magnitude based on a combination of the third force magnitude weighted by the third force input area and the fourth force magnitude weighted by the fourth force input area.

10.3 Modifying Sensor Force Thresholds

As shown in FIG. 9, Blocks of the method S200 recite: in a first mode, at a first time, scanning an array of sense electrodes, arranged under the touch sensor surface, to generate a first force image in Block S210; detecting, in the first force image, a first force input at a first location on the touch sensor surface, the first force input of a first force value exceeding a first force threshold in Block S212; detecting, in the first force image, a second force input at a second location on the touch sensor surface, the second force input of a second force value exceeding the first force threshold in Block S214; in response to the second location falling within a threshold distance of the first location, entering a second mode in Block S220; in the second mode: at a second time succeeding the first time, scanning the array of sense electrodes to generate a second force image in Block S222; detecting, in the second force image, a third force input at a third location on the touch sensor surface, the third force input of a third force value exceeding a second force threshold greater than the first force threshold in Block S224; detecting, in the second force image, a fourth force input at a fourth location on the touch sensor surface, the fourth force input of a fourth force value exceeding the second force threshold in Block S226. Generally, the controller 130 can execute Blocks S210, S212, S214, S216, S220, S222, and S226 to, in the glove-input detection mode, increase a force threshold at which the controller 130 identifies and characterizes inputs within a force image, thereby reducing probability of erroneously reading and classifying aberrant, low force inputs.

In one implementation, the controller 130 can, following initiation of the glove-input detection mode, scan the array of sense electrodes and/or a subset of sense electrodes in the array of sense electrodes to generate a force image and detect a force input in the force image in response to force values exceeding a particular threshold greater than a force threshold implemented by the controller prior to initiation of the glove-input detection mode. The controller 130 can define a uniform force threshold across all pixels within a force image. The controller 130 can detect inputs based on detecting force values exceeding the uniform force threshold at particular pixels within the force image. Following initiation of the glove-input detection mode, the controller 130 can increase the uniform force thresholds globally and apply the uniform force threshold across all pixels of the force image.

Alternatively, the controller 130 can define a gradient of force thresholds across pixels within the force image. The controller 130 can detect inputs based on detecting force values exceeding a particular force threshold defined by the gradient of force thresholds at a particular pixel within the force image. Following initiation of the glove-input detection mode, the controller 130 can increase each force threshold in the gradient of force thresholds by either a uniform or varied amount and apply the (updated) gradient of force thresholds across all pixels of the force image.

However, the controller 130 can decrease sensitivity of the touch sensor by any other means.

10.4 Input Types

As described above, the controller 130 can execute Blocks of the method S200 to classify the singular input according to predefined input types, such as a finger input type and/or a non-finger input type in the glove-input detection mode. Generally, the controller 130 can define and assign input types to inputs based on geometry (e.g., a geometry dimension) of the singular input and/or a ratio of the force magnitude to area of the singular input.

For example, in response to a ratio of the singular input force magnitude to a geometry dimension of the singular input exceeding a threshold magnitude, the controller 130 can characterize the singular input as a finger (i.e., a gloved-finger) input type; and, in response to the ratio remaining below the threshold magnitude, characterizing the singular input as a non-finger input type. Thus, the controller 130 can output a location, force magnitude, and type of the singular input to a computing device coupled to the array of sense electrodes.

Additionally or alternatively, the controller 130 can output, to the computing device, a cursor location and a specification of the singular input as a hover input type in response to the singular input force magnitude exceeding the first force threshold and remaining below an intentional input threshold. Likewise, the controller 130 can output a specification of the singular input as a definite input type (e.g., stylus, non-stylus, finger, palm) in response to the singular input force magnitude exceeding the first force threshold and exceeding the intentional input threshold. Thus, the controller 130 can output intentional inputs and reject aberrant and/or low threshold inputs.

10.5 Tracking

In one implementation, the controller can track motion of the singular input, as described above, across a period of time in response to detecting discrete inputs of similar areas and/or a similar composite area of the (calculated) singular input in successive force images. For example, at a third time succeeding the second time, the controller 130 can scan the array of sense electrodes to generate a third force image. The controller can then detect relocation of the singular input to a fifth location on the touch sensor surface in response to detecting a fifth force input and a sixth force input in the third force image, an input area encompassing the third location and the fourth location within a threshold area of an area encompassing the first location and the second location. In response to detecting relocation of the singular input to the third location, the controller 130 can then output, to the computing device, the third location and force values of the singular input in the third location.

10.6 Default Mode

As described above and shown in FIGS. 1 and 2, the controller 130 can dynamically shift between the glove-input detection (or second) mode to a normal (or first) mode in response to detecting absence of a second force input within a threshold distance of a first force input in a particular force image. Generally, the controller 130 can execute Blocks of the method S200 in a glove-input detection mode in response to detecting closely proximal inputs likely by a gloved-finger; and can execute Block S100 in a first (default) mode in response to detecting distributed inputs in a force image.

Thus, as described above, in response to detecting absence of a second force input within a threshold distance (e.g., 0.5 centimeters) of the first force input in a particular force image, the controller 130 can continue operation in the first mode. For example, the controller 130 can, in response to a second location of the second input falling outside a threshold distance from a first location of a first input and, in response to a ratio of a first force magnitude of the first force input to a first geometry dimension of the first force input exceeding a threshold ratio, characterize the first force input as a stylus input type; and output to the computing device the first location of the first force input, the second location of the second force input, and a specification of the first force input as a stylus input type. Furthermore, the controller 130 can, in response to a first geometry dimension of the first force input exceeding a first threshold, characterize the first force input as a non-stylus input type; in response to the first geometry dimension of the first force input remaining below the first threshold: at a third time succeeding the first time, scan a subset of the array of sense electrodes at a second resolution greater than the first resolution to generate a third force image, the subset of the array of sense electrodes coincident the first force input; detect a fourth force input in the second force image proximal the first force input; and, in response to a ratio of a force magnitude of the fourth force input to a second geometry dimension of the fourth force input exceeding a second threshold, characterize the first force input as a stylus input type; and outputting, to the computing device coupled to the array of sense electrodes, a location and a type of the first force input.

Additionally or alternatively, the controller 130 can intermittently switch between the first (default) mode and the second (glove-input detection) mode. In particular, in response to detecting a first force input within a threshold distance of second force input in a force image, the controller 130 can initiate the second mode at a first time and sustain the second mode for a time window (e.g., 1 second) following the first time. In response to expiration of the time window, the controller 130 can transition to the first mode and sustain the first mode until the controller 130 again detects closely proximal force inputs within a force image.

Alternatively, the controller 130 can initiate the second mode at a first time and sustain the second mode indefinitely and/or until the controller 130 detects a trigger to initiate the first (default) mode. In particular, the controller 130 can initiate the second mode at a first time in response to detecting a first force input within a threshold distance of a second force input and merge the first and second force inputs into a singular input. For an indefinite period succeeding the first time, the controller 130 can interpret force inputs within the threshold distance as singular inputs. However, at a second time within the indefinite period, in response to detecting an isolated input falling outside of the threshold distance of a second input, the controller 130 can initiate the first (default) mode.

Furthermore, the controller 130 can initiate the first mode and/or the second mode substantially simultaneously across discrete subsets of sense electrodes in the array of sense electrodes. For example, at a first time, the controller 130 can initiate the first mode for a first subset of sense electrodes proximal a corner of the touch sensor surface in response to detecting a stylus input in a first force image offset from any other force input by more than the threshold distance and proximal a corner of the touch sensor surface. The controller 130 can also initiate the second mode at the first time for a second subset of sense electrodes proximal a center of the touch sensor surface in response to detecting a first force input within the threshold distance of a second force input in the first force image and proximal a center of the touch sensor surface.

The controller 130 can also switch from the second mode into the first mode in response to detecting relocation of the first force input and the second force input over a period of time to different locations at which a distance between the first and second force inputs exceeds the threshold distance. In particular, the controller 130 can generate a second force image; interpret a third force value in the second force image that exceeds the force threshold as a third force input at a third location on the touch sensor surface; interpret a fourth force value in the second force image that exceeds the first force threshold as a fourth force input at a fourth location on the touch sensor surface; and matching the third force input to the first force input and the fourth force input to the second force input. In response to the fourth location falling outside the threshold distance from the third location, the controller 130 can transition the system to the first mode and, thus, output to the computing device the third location of the third input and the fourth location of the fourth input.

However, the controller 130 can selectively transition between modes in any other way in response to any other trigger and can define any other additional modes to aid classification of input types.

10.6 Modifying Resolution

As described above, one variation of the method S200 includes, in a first mode: at a first time, scanning an array of sense electrodes, arranged under the touch sensor surface, at a first resolution to generate a first force image; interpreting a first force value in the first force image that exceeds a first force threshold as a first force input at a first location on the touch sensor surface; interpreting a second force value in the first force image that exceeds the first force threshold as a second force input at a second location on the touch sensor surface; in response to the second location falling within a threshold distance of the first location, entering a second mode; in the second mode: at a second time succeeding the first time, scanning the array of sense electrodes at a second resolution greater than the first resolution to generate a second force image; interpreting a third force value in the second force image that exceeds a second force threshold as a third force input at a third location on the touch sensor surface; interpreting a fourth force value in the second force image that exceeds the second force threshold as a fourth force input at a fourth location on the touch sensor surface; in response to the third location falling within a threshold distance of the first location, merging the third force input and the fourth force input into a singular input defining a singular input area encompassing the third force input and the fourth force input and characterized by a singular input force magnitude representing a combination of the third force value and the fourth force value; and outputting, to a computing device connected to the input device, the singular input area and the singular input force magnitude of the singular input.

Generally, in this variation and as described above, the controller can modify (or increase) a resolution of a scan of the array of sense electrodes in response to detecting proximal inputs in order to accurately calculate distances between discrete inputs and areas of discrete input and determine relevancy of the first and second modes to subsets of inputs within a force image.

Furthermore, as described above and shown in FIGS. 10A and 10B, the controller 130 can intermittently upsample resolution of a force image to reduce error of calculated areas, distances, force magnitudes, etc. For example, the controller 130 can read a set of raw force values from rows and columns of sense electrodes; interpolate between force values in the set of raw force values to generate a set of interpolated force values; and compile the set of raw force values and the set of interpolated force values into the first force image. Then the controller can interpret a first contiguous cluster of force values, in the set of raw force values and the set of interpolated force values, exceeding the first force threshold as the first force input and interpret a second contiguous cluster of force values, in the set of raw force values and the set of interpolated force values, exceeding the first force threshold as the second force input. Thus, the controller can calculate an offset distance between a centroid of the first contiguous cluster and the centroid of the second contiguous cluster in the first force image and, thus, enter the second mode in response to the offset distance exceeding the threshold distance, entering the second mode.

However, the controller 130 can selectively modify touch sensor resolution and force thresholds in any other way to trigger the first and second modes.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for detecting and characterizing inputs comprising:
   at a first time, scanning an array of sense electrodes, at a first resolution to generate a first force image;
   detecting a first force input in the first force image;
   in response to a first geometry dimension of the first force input exceeding a first threshold, characterizing the first force input as a non-stylus input type;
   in response to the first geometry dimension of the first force input remaining below the first threshold:
      in response to a first ratio of a first force magnitude of the first force input to a second geometry dimension of the first force input exceeding a second threshold, characterizing the first force input as a stylus input type;
      in response to the first ratio falling below the second threshold, characterizing the first force input as a non-stylus input type; and
   outputting, to a computing device coupled to the array of sense electrodes, a location and a specification for a type of the first force input.

2. The method of claim 1:
   further comprising:
      in response to the first geometry dimension of the first force input remaining below the first threshold:
         at a second time succeeding the first time, scanning a subset of the array of sense electrodes at a second resolution greater than the first resolution to generate a second force image, the subset of the array of sense electrodes coincident the first force input; and
         detecting a second force input in the second force image proximal the first force input; and
      wherein characterizing the first force input as a stylus input type comprises, in response to a second ratio of a second force magnitude of the second force input to a second geometry dimension of the second force input exceeding a second threshold, characterizing the first force input as a stylus input type.

3. The method of claim 1:
   further comprising:
      calculating a first best-fit ellipse encompassing the first force input in the first force image; and
      extracting the first geometry dimension comprising a length of a major axis of the first best-fit ellipse; and
      characterizing the first input as a possible stylus input in response to the length of a major axis of the first best-fit ellipse remaining below the first threshold; and
   wherein scanning the array of sense electrodes at the second resolution to generate the second force image comprises generating the second force image in response to characterizing the first input as the possible stylus input.

4. The method of claim 1, further comprising:
   wherein scanning the array of sense electrodes to generate the first force image comprises:
      scanning the array of sense electrodes at the first resolution less than a natural resolution of the array of sense electrodes to generate a set of raw force values from rows and columns of sense electrodes;
      interpolating between force values in the set of raw force values to generate a set of interpolated force values; and
      compiling the set of raw force values and the set of interpolated force values into the first force image, a resolution the set of raw force values and the set of interpolated force values in the first force image corresponding to the natural resolution of the array of sense electrodes;
   wherein detecting the first force input in the first force image comprises interpreting a first contiguous cluster of force values, in the set of raw force values and the set of interpolated force values, exceeding a minimum force threshold as the first force input; and
   further comprising:
      defining a contiguous boundary encompassing force values, defined in the first force image, exceeding the minimum force threshold; and
      calculating the first geometry dimension as a function of an input area encompassed by the contiguous boundary.

5. The method of claim 1:
   wherein outputting the location and the type of the first force input comprises outputting the location and the type of the first force input at approximately the first time;
   further comprising:
      at a third time succeeding the second time, scanning the array of sense electrodes at the first resolution to generate a third force image;
      detecting relocation of the first force input from a first location in the first force image to a second location in the third force image;

in response to a third geometry dimension of the third force input exceeding the first threshold:
characterizing the first force input in the second location as the non-stylus input type;
outputting, to the computing device, the third location and the non-stylus input type of the first force input at approximately the third time; and
outputting, to the computing device, an update specifying the first force input in the first location at the first time as the non-stylus input type.

6. The method of claim 1, further comprising:
in response to the first ratio remaining below the threshold magnitude, characterizing the first force input as a palm input type;
detecting, in the first force image, a third force input offset from the first force input;
in response to a third ratio of a third force magnitude of the third force input to a third geometry dimension of the third force input exceeding the second threshold, characterizing the third force input as the stylus input type;
defining a virtual vector from the first force input to the third force input;
at a third time succeeding the first time, scanning the array of sense electrodes at the first resolution to generate a third force image;
detecting, in the third force image, relocation of the first force input from a first location to a second location of the touch sensor surface;
in response to detecting a fourth force input and a fifth force input in the third force image,
projecting the virtual vector onto the third force image;
projecting the fourth force input and the fifth force input onto the virtual vector, a projection of the fourth force input on the virtual vector a first distance from the centroid of the first force input, a projection of the fifth force input on the virtual vector a second distance from the first force input less than the first distance;
in response to detecting the first distance exceeding the second distance, characterizing the fourth force input as the stylus input type and the fifth force input as the non-stylus input type; and
outputting to the computing device a location, a specification for a type of the fourth force input, and a specification for a type of the fifth force input.

7. A system for detecting and characterizing inputs on a touch sensor surface comprising:
a touch sensor comprising:
a substrate;
an array of sense electrodes patterned across the substrate; and
a resistive layer arranged over the substrate and comprising a material exhibiting changes in local contact resistance responsive to variations in magnitude of force communicated into the resistive layer;
a force-spreading layer arranged over the resistive layer, defining the touch sensor surface, and distributing a force applied on and normal to the touch sensor surface laterally and into the resistive layer; and
a controller configured to:
detect an input on the force-spreading layer based on local changes in resistance within the resistive layer measured by a subset of sense electrodes in the touch sensor; and
characterize the first force input as one of a stylus input type and a non-stylus input type based on a ratio of a detected force magnitude to a detected area of the first force input on the force-spreading layer.

8. The system of claim 7, wherein the controller is configured to:
scan an array of sense electrodes at a first resolution to generate a first force image;
detect a first force input in the first force image;
in response to detecting a first geometry dimension exceeding a first threshold, characterize the first force input as a non-stylus input type;
in response to detecting a first geometry dimension coincident the first force input remaining below the first threshold:
scan a subset of the array of sense electrodes at a second resolution greater than the first resolution to generate a second force image, the subset of the array of sense electrodes coincident the first force input;
detect a second force input in the second force image proximal the first force input; and
in response to a second ratio of a second force magnitude of the second force input to a second geometry dimension of the second force input exceeding a second threshold, characterize the first force input as a stylus input type; and
output, to a computing device coupled to the array of sense electrodes, a location and a specification for a type of the first force image.

9. The system of claim 7, wherein the controller is configured to:
scan every fourth row and every fourth column of the array of sense electrodes to generate the first force image; and
scan every second row and every second column of the subset of the array of sense electrodes coincident the first force input to generate the second force image.

10. A method for detecting and characterizing inputs on a touch sensor surface of an input device, the method comprising:
at a first time, scanning an array of sense electrodes, arranged under the touch sensor surface, at a first resolution to generate a first force image;
detecting a first force input in the first force image;
in response to a first geometry dimension of the first force input exceeding a first threshold, characterizing the first force input as a non-stylus input type;
in response to the first geometry dimension of the first force input remaining below the first threshold:
at a second time succeeding the first time, scanning the array of sense electrodes at a second resolution greater than the first resolution to generate a second force image;
detecting a second force input in the second force image proximal the first force input; and
in response to a second ratio of a second force magnitude of the second force input to a second geometry dimension of the second force input exceeding a second threshold, characterizing the first force input as a stylus input type; and
outputting, to a computing device coupled to the input device, a location and a specification for a type of the first force input.

11. The method of claim 10, wherein outputting the location and the type of the first force input comprises outputting, to the computing device, a cursor location and a specification of the first force input as a hover input type in response to the second force magnitude exceeding a force threshold and remaining below an intentional input threshold.

12. The method of claim 10:
wherein scanning the array of sense electrodes to generate the second force image comprises:
reading a set of raw force values from rows and columns of sense electrodes at the first resolution;
interpolating between force values in the set of raw force values to generate a set of interpolated force values; and
compiling the set of raw force values and the set of interpolated force values into the second force image;
wherein detecting the second force input in the second force image comprises interpreting a contiguous cluster of force values, in the set of raw force values and the set of interpolated force values, exceeding a force threshold as the second force input; and
further comprising:
defining a contiguous boundary encompassing force values, defined in the second force image, exceeding a minimum force threshold;
calculating the second geometry dimension as a function of an input area encompassed by the contiguous boundary; and
calculating the second force magnitude as a function of a peak force value within the contiguous boundary in the second force image.

13. The method of claim 10:
wherein scanning the array of sense electrodes to generate the first force image comprises:
scanning the array of sense electrodes at the first resolution less than a natural resolution of the array of sense electrodes to generate a set of raw force values from rows and columns of sense electrodes;
interpolating between force values in the set of raw force values to generate a set of interpolated force values; and
compiling the set of raw force values and the set of interpolated force values into the first force image, a resolution of the set of raw force values and the set of interpolated force values in the first force image corresponding to the natural resolution of the array of sense electrodes;
wherein detecting the first force input in the first force image comprises interpreting a first contiguous cluster of force values, in the set of raw force values and the set of interpolated force values, exceeding a minimum force threshold as the first force input; and
further comprising:
defining a contiguous boundary encompassing force values, defined in the first force image, exceeding the minimum force threshold; and
calculating the first geometry dimension as a function of an input area encompassed by the contiguous boundary.

14. The method of claim 10:
wherein outputting the location and the type of the first force input comprises outputting the location and the type of the first force input at approximately the first time;
further comprising:
at a third time succeeding the second time, scanning the array of sense electrodes at the first resolution to generate a third force image;
detecting relocation of the first force input from a first location in the first force image to a second location in the third force image;
in response to a third geometry dimension of the third force input exceeding the first threshold:
characterizing the first force input in the second location as the non-stylus input type;
outputting, to the computing device, the third location and the non-stylus input type of the first force input at approximately the third time; and
outputting, to the computing device, an update specifying the first force input in the first location at the first time as the non-stylus input type.

15. The method of claim 10:
wherein scanning the array of sense electrodes at the first resolution comprises scanning every fourth row and every fourth column of the array of sense electrodes to generate the first force image; and
wherein scanning the array of sense electrodes at the second resolution to generate the second force image comprises scanning every second row and every second column in the subset of the array of sense electrodes coincident an area of the first force input on the touch sensor surface to generate the second force image.

16. The method of claim 10, further comprising:
interpolating between force values in the first force image to generate a first set of interpolated force values; and
compiling a first set of raw force values in the first force image and the first set of interpolated force values into the first force image, a resolution of the first set of raw force values and the first set of interpolated force values in the first force image corresponding to a natural resolution of the array of sense electrodes;
interpolating between force values in the second force image to generate a second set of interpolated force values; and
compiling a second set of raw force values in the second force image and the second set of interpolated force values into the second force image, a resolution of the second set of raw force values and the second set of interpolated force values in the second force image corresponding to the natural resolution of the array of sense electrodes.

17. The method of claim 10:
further comprising:
calculating a first best-fit ellipse encompassing the first force input in the first force image; and
extracting the first geometry dimension comprising a length of a major axis of the first best-fit ellipse; and
characterizing the first input as a possible stylus input in response to the length of a major axis of the first best-fit ellipse remaining below the first threshold; and
wherein scanning the array of sense electrodes at the second resolution to generate the second force image comprises generating the second force image in response to characterizing the first input as the possible stylus input.

18. The method of claim 10, further comprising:
at a third time succeeding the second time, scanning the array of sense electrodes at the first resolution to generate a third force image;
detecting relocation of the first force input from a first location to a second location adjacent the first location in response to detecting a third force input in the third force image, a third geometry dimension of the third force input approximately equal to the first geometry dimension of the first force input;

in response to relocation of the first force input from the first location to the second location, outputting to the computing device the second location and force values of the first force input in the second location.

19. The method of claim 10, further comprising:

in response to the second ratio remaining below the threshold magnitude, characterizing the first force input as a palm input type;

detecting, in the first force image, a third force input offset from the first force input;

in response to a third ratio of a third force magnitude of the third force input to a third geometry dimension of the third force input exceeding the second threshold, characterizing the third force input as the stylus input type;

defining a virtual vector from the first force input to the third force input;

at a third time succeeding the first time, scanning the array of sense electrodes at the first resolution to generate a third force image;

detecting, in the third force image, relocation of the first force input from a first location to a second location of the touch sensor surface;

in response to detecting a fourth force input and a fifth force input in the third force image,
projecting the virtual vector onto the third force image;

projecting the fourth force input and the fifth force input onto the virtual vector, a projection of the fourth force input on the virtual vector a first distance from the centroid of the first force input, a projection of the fifth force input on the virtual vector a second distance from the first force input less than the first distance;

in response to detecting the first distance exceeding the second distance, characterizing the fourth force input as the stylus input type and the fifth force input as the non-stylus input type;

outputting to the computing device a location, a specification for a type of the fourth force input, and a specification for a type of the fifth force input.

20. The method of claim 10:

wherein detecting the second force input in the second force image comprises detecting the second force input coincident a second location;

further comprising detecting a third force input in the second force image coincident a third location remote from the second location; and in response to detecting the third location falling within a threshold distance of the second location, characterizing the third force input as a non-stylus input type.

* * * * *